(12) United States Patent
Poulain et al.

(10) Patent No.: US 11,756,194 B2
(45) Date of Patent: Sep. 12, 2023

(54) COMPUTER-IMPLEMENTED PROCESS ON AN IMAGE OF A BIOLOGICAL SAMPLE

(71) Applicants: VILNIAUS UNIVERSITETAS, Vilnius (LT); UNIVERSITE DE CAEN NORMANDIE, Caen (FR); INSTITUT NATIONAL DE LA SANTE ET DE LA RECHERCHE MEDICALE, Paris (FR); CENTRE REGIONAL FRANCOIS BACLESSE, Caen (FR)

(72) Inventors: Laurent Poulain, Thue et Mue (FR); Arvydas Laurinavicius, Vilnius (LT); Benoît Plancoulaine, Lantheuil (FR); Nicolas Elie, IFS (FR)

(73) Assignees: Vilniaus Universitetas;, Vilnius (LT); Universite De Caen Normandie, Caen (FR); Institut National De La Sante Et De La Recherche Medicale, Paris (FR); Centre Regional Francois Baclesse, Caen (FR)

( * ) Notice: Subject to any disclaimer, the term of this patent is extended or adjusted under 35 U.S.C. 154(b) by 411 days.

(21) Appl. No.: 17/258,307

(22) PCT Filed: Jun. 27, 2019

(86) PCT No.: PCT/EP2019/067180
§ 371 (c)(1),
(2) Date: Jan. 6, 2021

(87) PCT Pub. No.: WO2020/011549
PCT Pub. Date: Jan. 16, 2020

(65) Prior Publication Data
US 2021/0272280 A1   Sep. 2, 2021

(30) Foreign Application Priority Data
Jul. 11, 2018 (EP) .................................. 18182961

(51) Int. Cl.
*G06T 7/00* (2017.01)
*G06F 16/55* (2019.01)
*G06T 7/60* (2017.01)

(52) U.S. Cl.
CPC ............ *G06T 7/0012* (2013.01); *G06F 16/55* (2019.01); *G06T 7/60* (2013.01); *G06T 2207/30004* (2013.01)

(58) Field of Classification Search
CPC ..................... G06T 7/0012; G06T 7/60; G06T 2207/30004; G06T 2207/30024; G06T 7/90; G06F 16/55
See application file for complete search history.

(56) References Cited

U.S. PATENT DOCUMENTS

2008/0118124 A1* 5/2008 Madabhushi ......... G06T 7/0012
382/128

OTHER PUBLICATIONS

Meas-Yedid, V., et al., "Automatic color space selection for biological image segmentation", Proceedings of the 17th International Conference on Cambridge, UK, Aug. 23-26, 2004, pp. 514-517.
(Continued)

*Primary Examiner* — Siamak Harandi
(74) *Attorney, Agent, or Firm* — Christensen O'Connor Johnson Kindness PLLC

(57) ABSTRACT

Computer-implemented process on an image of a biological sample The present invention relates to a computer-implemented process to automatically analyze a digital image (103) of abiological sample (101). The process involves a change (203) from a first color space to a second color space. Then, fits are performed taking into account several dimensions of the second color space to classify pixels.

14 Claims, 22 Drawing Sheets

(56) References Cited

OTHER PUBLICATIONS

Ohta Y-I., et al., "Color Information for Region Segmentation", Computer Graphics and Image Process, Academic Press, New York, US, vol. 13, No. 3, Jul. 1, 1980, pp. 222-241.
Lezoray, O., et al., "Segmentation d'images couleun Application en microscopie cellulaire", Traitement du Signal, Jan. 1, 2000, pp. 33-45.
Park, M., et al., "Microscopic Image Segmentation Based on Color Pixels Classification", Proceedings of the First International Conference on Internet Multimedia Computing and Service, Jan. 1, 2009, pp. 53-59.
International Search Report and Written Opinion from corresponding International Application No. PCT/EP2019/067180, filed Jun. 27, 2019, dated Sep. 6, 2019, 13 pages.

\* cited by examiner

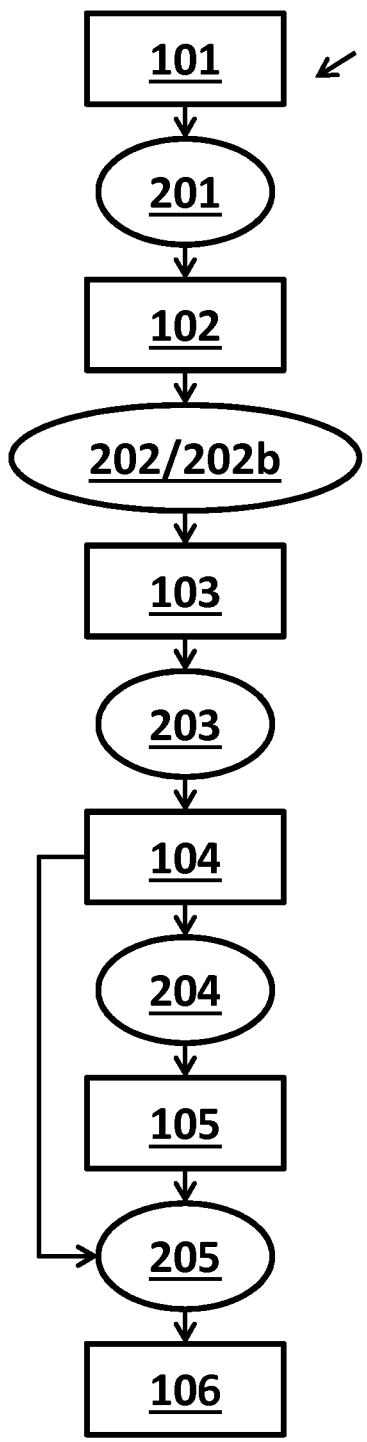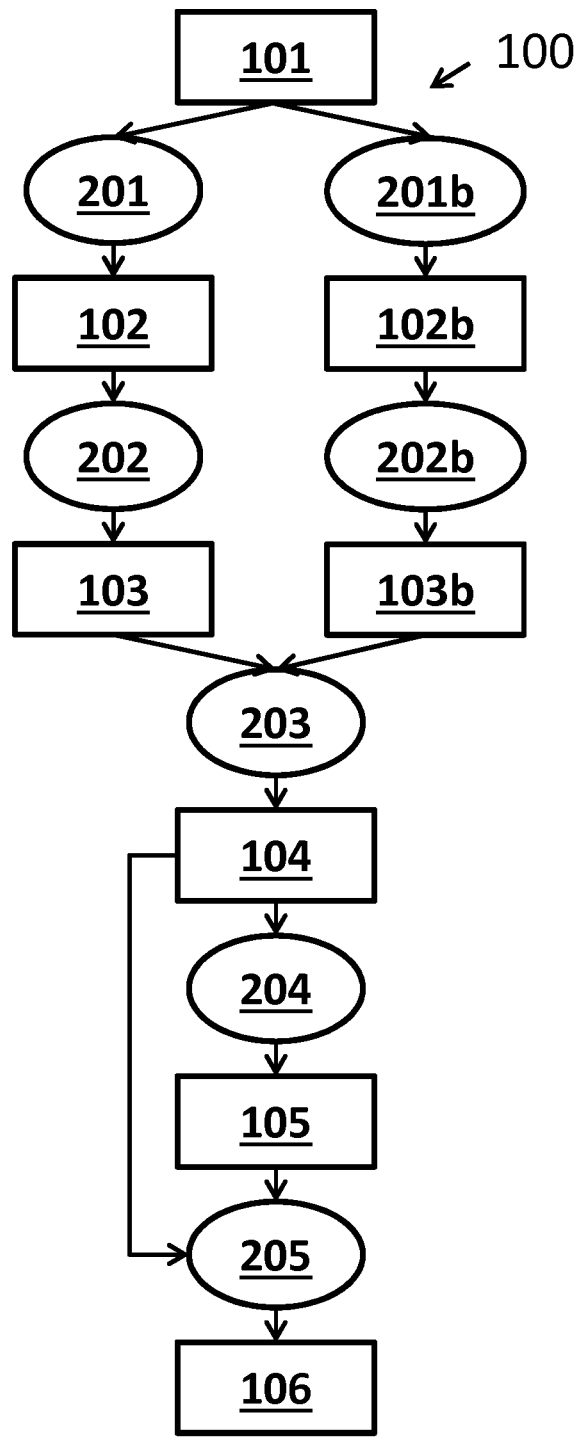
*Figure 1a*  *Figure 1b*

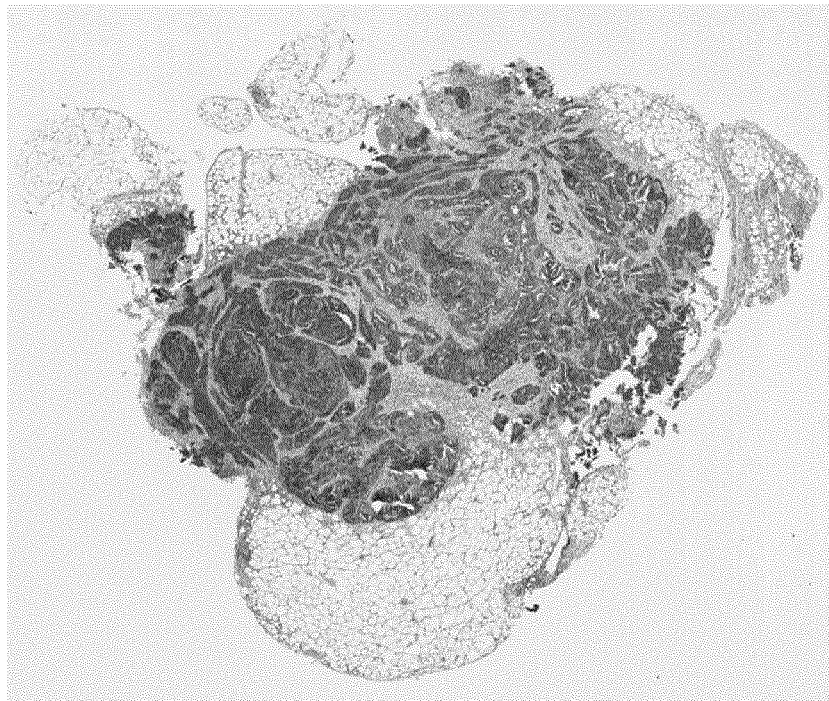
Figure 5
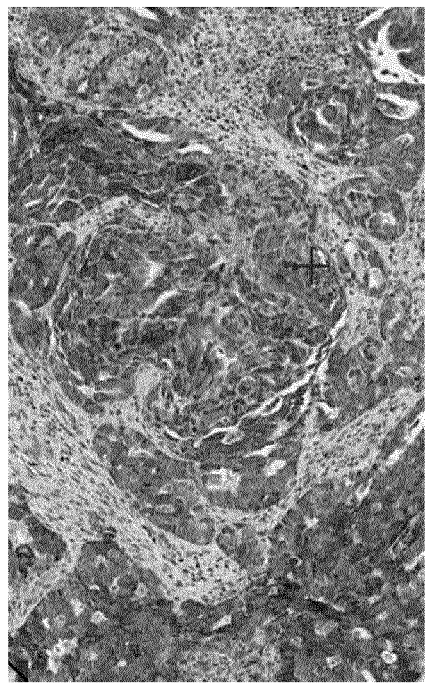 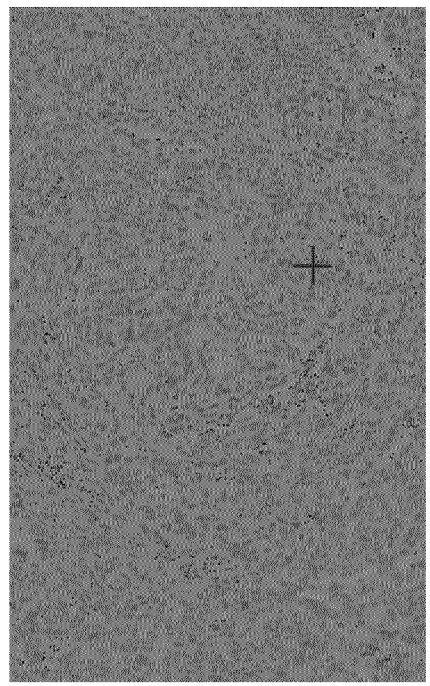
Figure 6a　　　　　　Figure 6b

705

707                                              706

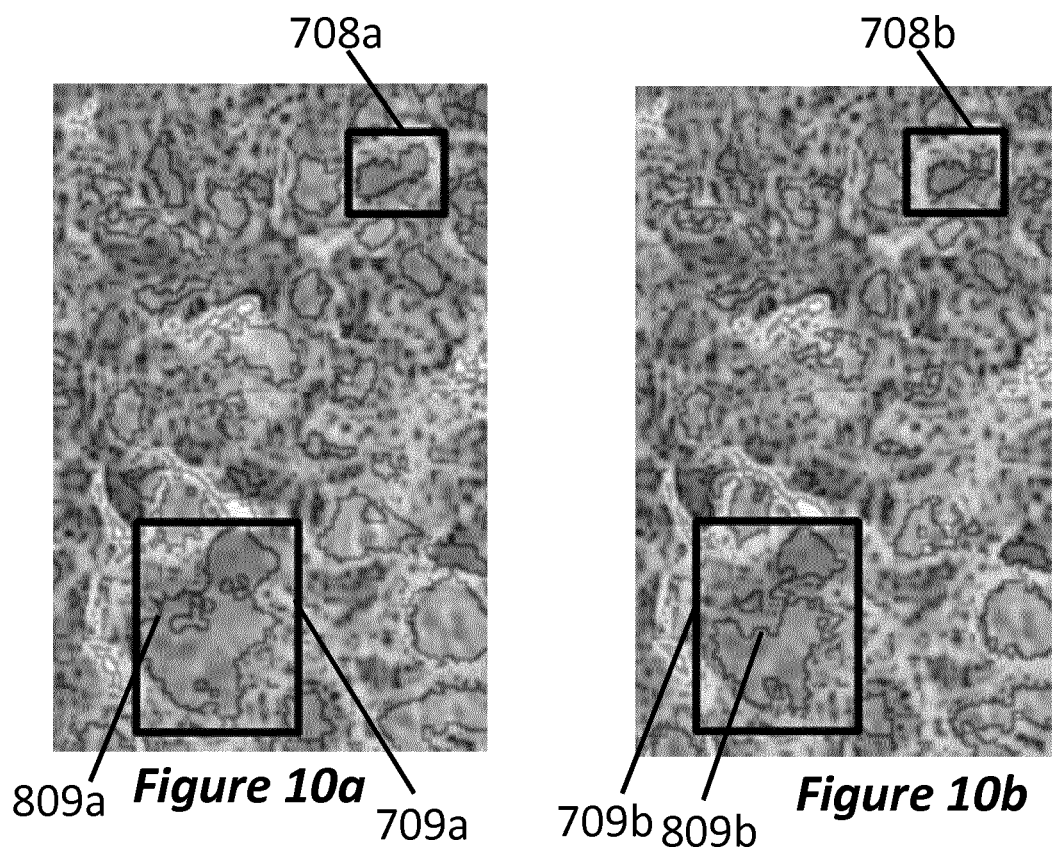
Figure 10a  Figure 10b
Figure 11
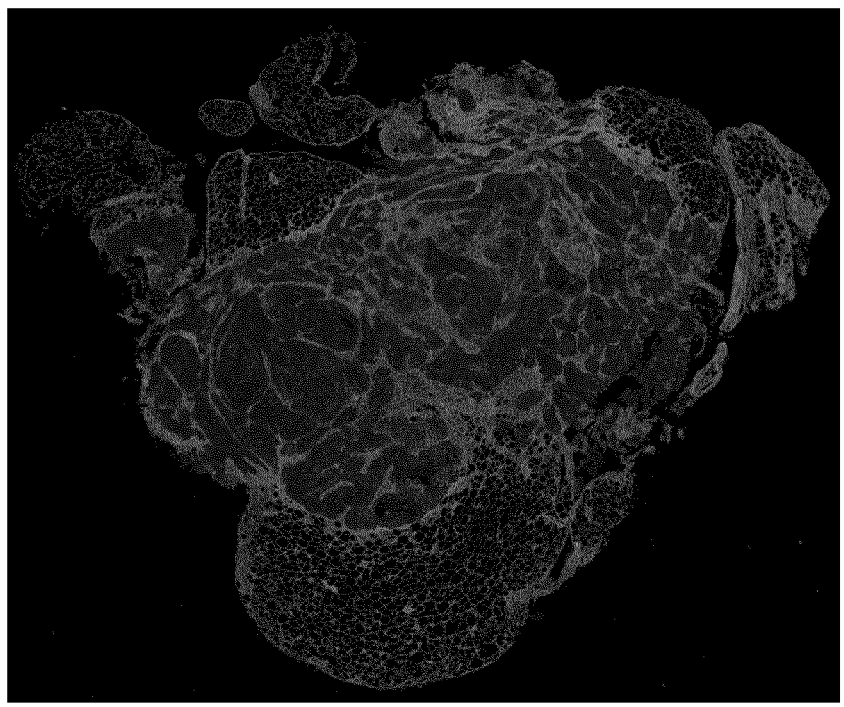

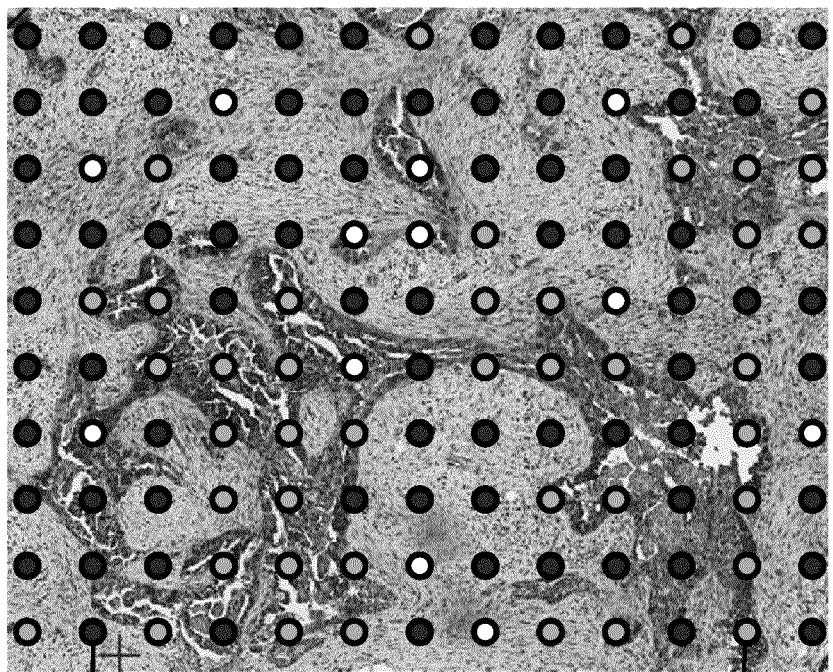
Figure 21b
707  706
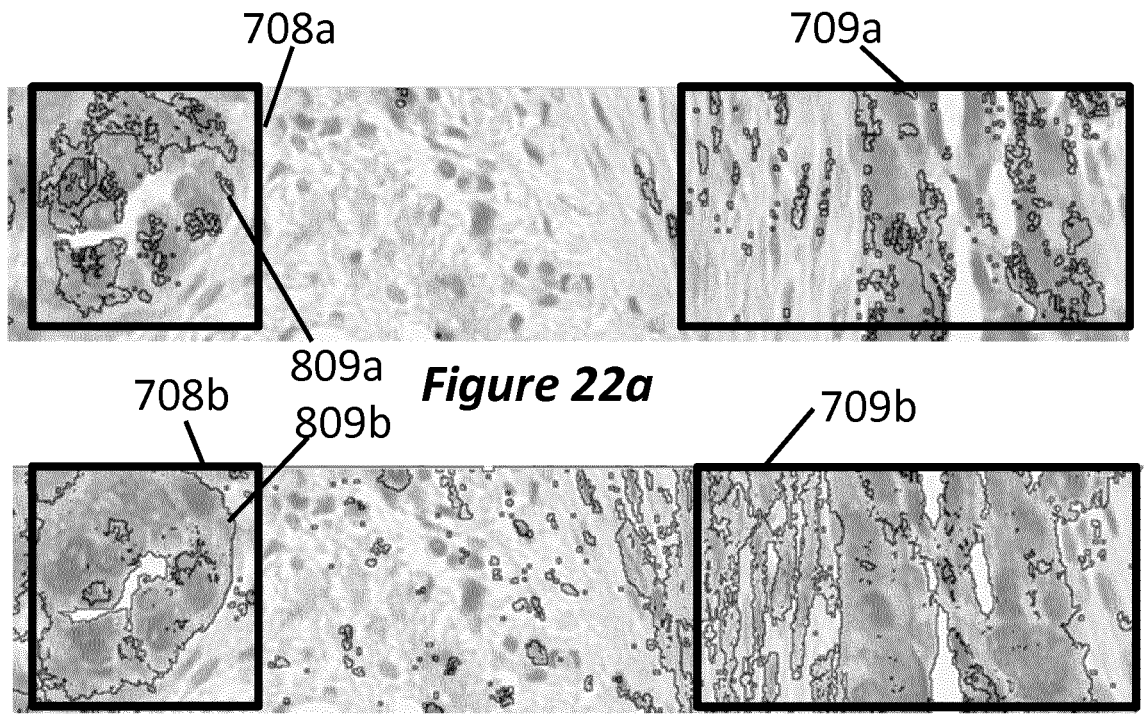
Figure 22a
Figure 22b

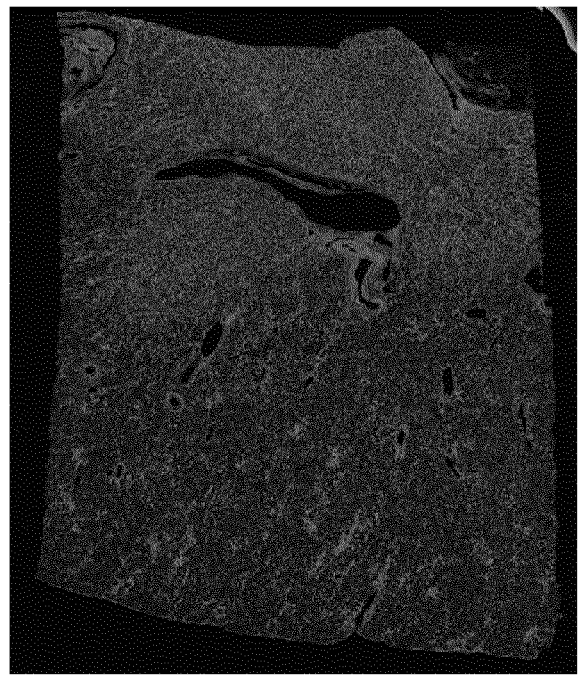
Figure 32
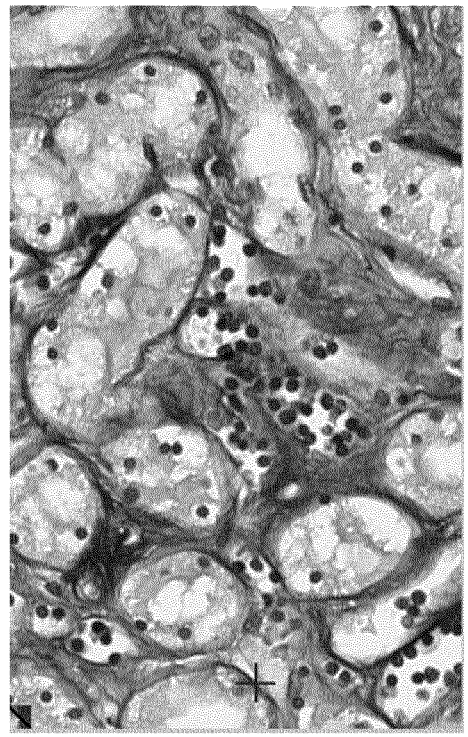 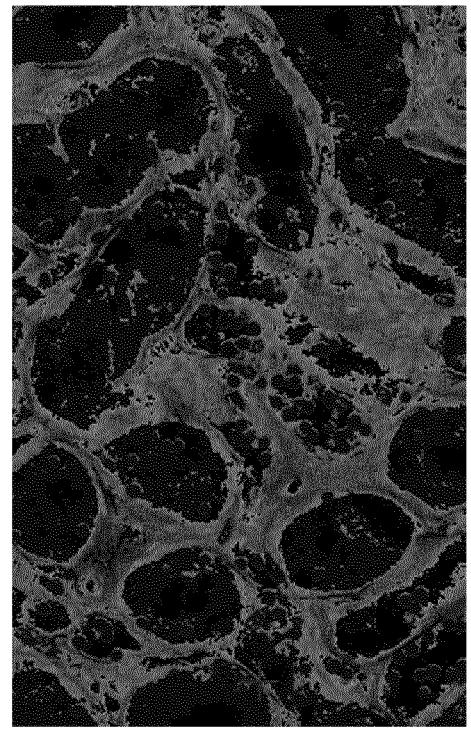
Figure 33a                    Figure 33b

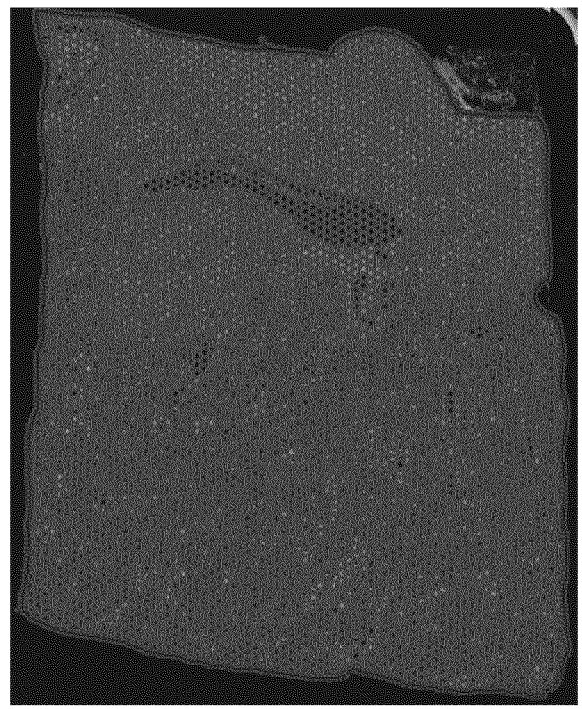
Figure 34
 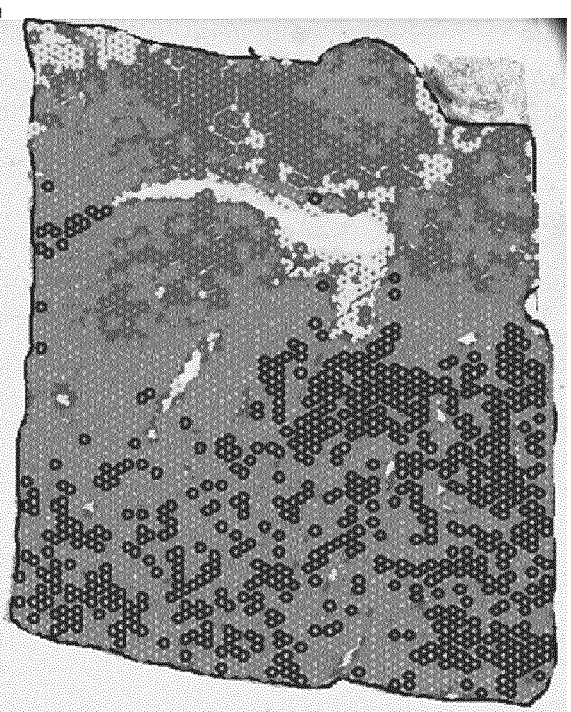
Figure 35　　　　　Figure 36

COMPUTER-IMPLEMENTED PROCESS ON AN IMAGE OF A BIOLOGICAL SAMPLE

FIELD OF THE INVENTION

The present invention relates to a computer-implemented process for classifying pixels of a digital image of an biological sample.

BACKGROUND OF THE INVENTION

Processes for automated treatment of images of biological sample are known. However, the automated classification of the pixels, for example as function of their color, is usually unsatisfactory. For example, very often, pixels are erroneously classified as stained whereas they are in an area that is actually unstained.

Document MEAS-YEDID V ET AL: "Automatic color space selection for biological image segmentation", PATTERN RECOGNITION, 2004. ICPR 2004. PROCEEDINGS OF THE 17TH INTERNATIONAL CONFERENCE ON CAMBRIDGE, UK Aug. 23-26, 2004, PISCATAWAY, N.J., USA. IEEE, LOS ALAMITOS, Calif., USA, vol. 3, 23 Aug. 2004 (2004 Aug. 23), pages 514-517, describes an automatic color space selection for biological image segmentation.

SUMMARY OF THE INVENTION

It is therefore an object of the present invention to provide a process for automated treatment of images of biological sample with increased accuracy on the classification of the pixels.

According to a first aspect, an object of the invention is a process for classifying pixels of a digital image of a biological sample and comprising the steps of:
(a) receiving a first digital image representing the biological sample, in order to obtain a value $X_1$ associated with each pixel of the first digital image, and obtaining at least one other value $X_i$ for each pixels, from the first digital image and/or from a further digital image, i being an integer such that $2 \leq i \leq n$ and n being an integer such than $n \geq 2$;
(b) changing of space with the matrix multiplication $$I = A \times X$$

to obtain a second digital image, X being a matrix of n lines and 1 column including the values $X_1$ to $X_n$, I being a matrix of m lines and 1 column including values $I_1$ to $I_m$, m being an integer equal to 2 or higher, $I_1$ to $I_m$ being values associated with each pixel of the second digital image, A being a matrix of m lines and n columns;
(c) determining a classification condition based on the values in $I_1$ and on the values in $I_j$ of at least some pixels in the second digital image with $j>1$ and $j \leq m$; and
(d) classifying pixels of the second digital image that fulfill the classification condition in a first class;
wherein step (c) comprises:
  determining a set of one or several distribution(s), the set comprising at least one distribution of a number of pixels in the second digital image as function of $I_1$ and the set comprising at least one distribution of a number of pixels in the second digital image as function of $I_j$ with $j>1$ and $j \leq m$,
  fitting the distribution(s) of the set to determine at least one fitting parameter, and
  determining the classification condition from the at least one fitting parameter.

In the process according to the invention, several colors of the first digital image or at least one color of the first digital image and at least one color of the further digital image are combined in a common matrix X, for each pixel of the first digital image. This matrix synthetizes thus relevant information in a tool that is mathematically easy to use, in a first space. The matrix X is then transformed to get the information in a second space where the information is easier to handle. The matrix I is obtained from that transformation. Then, a frequency analysis is performed, which involves fit(s) of distribution(s) on at least two coefficients of matrix I (i.e. two dimensions in the second space), in order to determine the classification condition. The classification condition is checked for the pixels of the second digital image, for example considered one after each other, to classify them (or not) in the first class.

In the invention, it is very interesting that the determination of the classification condition uses information coming from several dimensions in the second space. Indeed, this crossing of different sources of information makes possible to get a classification condition that is especially trustworthy.

The values $X_i$ and $I_j$ of the pixels may be called "colors", even if they are not actual colors in all embodiments of the invention. The matrix X may be considered as defining the pixel in a first color space and the matrix I as defining the pixel in a second color space. The change of space between the values $X_i$ of the pixels and the values $I_j$ of the pixels may be called a change of color space.

When at least one $X_i$ for $i \geq 2$ is obtained from the further digital image, pixels from the first digital image and the further digital image are matched in such a way that there is an overlay between the structures or objects of the first digital image and the further digital image. The same applies when more than two images are used as input for the process. When the first digital image and the further digital image are used to determine the values of X, the second digital image is a combination of information originating from the first digital image and the further digital image.

In the method according to the invention, the determination of the classification condition takes into account at least one distribution as function of at least one of the elements of matrix I. The distribution(s) is/are comprised in the set of one or several distribution(s). A distribution of the set is function of $I_1$, $f(I_1)$. A distribution of the set is function of $I_j$ ($m \geq j > 1$), wherein said distribution can be the same as the distribution that is function of $I_1$ [and may be written $f(I_1, I_2)$] or said distribution can be another distribution, which is not function of $I_1$, $g(I_j)$ with $m \geq j > 1$. Said distribution(s) may be function of other coefficients of matrix I.

The use of a distribution makes possible to take into account information from the full range of color value. For example, a unidimensional distribution in I, and a unidimensional distribution in $I_2$ or $I_3$ or in any $I_j$ for $m \geq j > 1$ can be used; or a bidimensional distribution in $I_1$ and $I_2$ or $I_3$ or in any $I_j$ for $m \geq j > 1$ can be used.

The classification condition preferably involves the values of the considered pixel in several dimensions of I and reference values in said dimensions of 1.

Preferably, the classification condition comprises a condition that concerns the values of the considered pixel in $I_1$ and $I_j$ together. For example, the classification condition may be that $$(I_1 - I_1^0)^2 + (I_2 - I_2^0)^2 < R^2$$

where $I_1^0$, $I_2^0$, and R are reference values obtained from step (c) and $X=(I_1, I_2)$ is the considered pixel.

The fit makes typically possible to roughly determine color ranges corresponding to color or staining of pixels. The fitting parameter quantifies these color ranges. The classification condition preferably reflects the separation between the ranges of colors.

In the frame of the present document, the biological sample is preferably a histological section or a plurality of serial histological sections, for example spaced by 2 to 5 µm. It may also be, for example, a biological tissue, a sample of blood, one or several cells, etc. The process according to the invention may be used in histology, cytology, hematology, . . . .

The determination of a set of one or several distribution(s), the set comprising at least one distribution of a number of pixels in the second digital image as function of $I_1$ and the set comprising at least one distribution of a number of pixels in the second digital image as function of $I_j$ with m≥j>1 may be called a frequency analysis.

The process according to the invention is especially easy to implement in a software. It is also especially quick when performed by an electronic device like a computer.

The method can include another further step, for example any further step of image treatment, especially between steps (a) and (b). It is possible to perform a step of increasing or decreasing resolution between steps (a) and (b). Steps (b) to (d) can then be performed on pixels of another size than the pixels of the image originally taken.

The steps of the process are preferably performed in the following order: (a), (b), (c), and (d). However, it is possible that, for example, part of step (d) is performed before part of step (c).

The method according to the invention may include, at any stage, a selection of at least one part of the first, the further or the second digital image as being the "part(s) of interest". The process preferably continues only with the selected part(s). The selection is preferably performed between steps (a) and (b). For example, in an embodiment of the invention, a step between steps (a) and (b) or before step (a) includes that a biologist or a software selects on the first digital image one or several area(s) of interest. This can be useful to remove the areas that are clearly healthy and the artifacts (folds, spots, . . . ). Preferably, steps (b), (c) and (d) are then performed only on the area(s) of interest.

In an embodiment of the invention, the selection of at least one part of the first or the second digital image as being the "part(s) of interest" between steps (a) and (b) is based on the RGB color values of the pixels. It can for example include a thresholding as function of the color value of the pixels in blue, green or red. This is especially interesting for a carcinoma wherein the areas of interest, which correspond to the epithelium, may be selected by a thresholding process on a distribution of the blue color values.

The classification condition is preferably determined based on the values in $I_1$ and on the values in $I_j$ with m≥j>1 of all the pixels in the second digital image.

In the frame of the present document, a digital image is a matrix of pixel. Some digital images may be color digital images wherein three color values are associated with each pixel.

Preferably, each pixel is present in the first digital image and in the second digital image but it has different values in the first and in the second digital images.

In the first picture, three values are associated with each pixel: a value in red, a value in green and a value in blue. The first picture can be said to be in a first color space that is a red green blue (RGB) color space. In the second picture, three values are associated with each pixel: a value in $I_1$, a value in $I_2$ and a value in $I_3$. The second picture can be said to be in a second color space. The second color space is not an RGB color space. The second color space may be called an Ohta color space.

The color value $I_1$ can be called "intensity". The color value $I_2$ can be called "red against blue". The color value $I_3$ can be called "magenta against green".

In the frame of the present document, the classification condition may comprise several specific conditions. Preferably, the classification condition is fulfilled if all the specific conditions are fulfilled.

In the frame of the present document, a distribution is preferably a histogram.

In an embodiment of the invention, steps (a), (b), (c) and (d) are fully automated.

The process according to the invention is especially suitable for biological samples that are "stained", i.e., that are colored by any staining process or that are naturally colored. The staining process may be based for example of staining of proteins, DNA, RNA, differentiation of cells, . . . . The staining process may involve coloration by dye and/or may involve fluorescence and/or visible light, i.e., for hematoxylin, eosin, saffron. The staining process may involve chromogen compounds. The staining process may involve antibody/antigen reactions.

The staining may be performed with any staining process of biology or histology, in particular histochemistry. The staining is preferably performed with a staining apparatus. For example, the staining can be in blue (nuclei counterstained with haematoxillin) and brown (proteins of various origins immunodetected with conventional peroxidase/DAB systems). For example, the staining could allow the detection of proliferating cells (detection of ki67 or cyclin A), apoptotic cells (cleaved caspase 3, cleaved cytokeratin 18 . . . ), membrane antigens (growth factor receptors, adhesion receptors, death receptors . . . ), cytoplasmic proteins such as Bcl-2 family proteins, nuclear antigens (transcription factors . . . ) and so on.

In an embodiment of the invention, the biological sample is a histological section taken on a piece of tissue where a cancer is suspected.

Any digital photographic process can be used at step (a), for example using a camera or a scanner. The picture preferably represents the full biological sample.

In an embodiment of the invention, the first class includes pixels classified as representing a first type of structure or a first type of object, for example a tumoral compartment. The pixels that are not classified in the first class are considering as not representing the first type of structure or object. For example, the first class of pixels may correspond to "labelled", "colored" or "stained" pixels, while pixels that does not belong to the first class are considered as "uncolored" pixels, "unstained" pixels or "background" pixels.

It is also possible that the first class of pixels corresponds to pixels colored or stained in a first color, while pixels that does not belong to the first class may be uncolored, unstained or in another color, for example stained in another color.

In an embodiment of the invention, a process of separation of the first digital image into a stromal compartment and a tumoral compartment is also performed, for example in parallel with the process for classifying pixels according to the invention. Such a separation process is for example described in WO2004084135. An embodiment of the invention includes the process for classifying pixels according to the invention and a step of determining the pixels of the first class that belong to the tumoral compartment.

After the process according to the invention, the pixels of the first class can be used for further analysis. This further analysis may comprise an allocation of the pixels, preferably the pixels of the first class, into macro-pixels. The macro-pixels are preferably hexagonal. The allocation is preferably a tiling. In an embodiment of the invention, the further analysis comprises an allocation of the pixels of the first class and that belong to the tumoral compartment into macro-pixels.

A histogram of macro-pixels can then be determined. It can be used for example for classification of tumors or for study of heterogeneity of tumors.

In an embodiment of the invention, step (c) comprises determining a further classification condition and step (d) comprises classifying in a second class pixels of the second digital image that fulfill the further classification condition. For example, the classification condition may correspond to a first range of color values in the color space of the second image and the further classification condition may correspond to a second range of color values in the color space of the second image.

In an embodiment of the invention, the set of distribution(s) comprises a distribution that is function of $I_1$ and function of $I_j$ with $m \geq j > 1$. This distribution has preferably at least two dimensions. This distribution can for example be fit by a sum of Gaussians in m dimensions.

In a first embodiment of the invention, the set of distribution(s) comprises several distributions that are function of $I_1$ and function of $I_j$ with $m \geq j > 1$. The set may for example comprises four distributions that are depending on $I_1$ and $I_2$ or $I_1$, $I_2$ and $I_3$.

In a second embodiment of the invention, the set of distribution(s) comprises a first distribution that is function of $I_1$ and a second distribution that is function of $I_j$ with $m \geq j > 1$. The first and second distributions may be unidimensional.

In an embodiment of the invention, the classification condition for a considered pixel relates to the value of the considered pixel in at least one of $I_1$, $I_2$ and $I_3$.

This makes possible to easily classify the pixels from their values in the second color space. The "considered" pixel is the pixel that is currently classified.

Preferably, the classification condition involves a threshold in at least one of $I_1$, $I_2$ and $I_3$ or a threshold in combination of at least two of $I_1$, $I_2$ and $I_3$ In an embodiment of the invention, the classification condition is that the pixels must have a value in $I_1$ higher than a threshold, said threshold having been determined from a distribution in $I_1$.

In an embodiment of the invention, the classification condition relates to the value of the considered pixel in $I_1$ and to the value of the considered pixel in the at least one $I_j$ with $m \geq j > 1$. In other words, the same dimensions are used for the fit(s) and for the classification.

Preferably, the classification condition involves a threshold in $I_1$ and a threshold in at least one of $I_2$ and $I_3$ or a threshold in combination of $I_1$, $I_2$ and $I_3$ In an embodiment of the invention, the classification condition is that the pixels must have a value in $I_1$ higher than a first threshold and a value in $I_2$ higher than a second threshold, said first having been determined from a distribution in $I_1$ and said first having been determined from a distribution in $I_2$.

In an embodiment of the invention, an empirical calibration parameter is used in the determination of the classification condition, said empirical calibration parameter having been determined by showing calibration biological samples, prepared in the same way as the biological sample, to biological practitioners.

There can be several empirical calibration parameters. There are preferably two empirical calibration parameters. There are more preferably one calibration parameter corresponding to $I_1$ and one calibration parameter corresponding to $I_j$, with $I_j$ the color value used to determine the classification condition. The determination of the empirical calibration parameter can be done much upfront the use of the claimed process. Preferably, the preparation conditions, including for example a staining tool and a staining dye, are identical in the preparation of the calibration biological samples and in the preparation of the biological sample analyzed by the claimed process. The "calibration biological samples" may also be called "dummy biological samples". The use of an empirical calibration parameter makes possible to take into account the experience of biological practitioners about which pixels they consider as "colored" and "non-colored". It makes therefore possible to calibrate the classification process according to the invention. For example, if the classification condition involves a threshold, the use of an empirical calibration parameter may influence the value of this threshold. Preferably, there is one calibration parameter per color value used at step (c). More preferably, there is one calibration parameter in $I_1$ and one calibration parameter in $I_2$ or $I_3$.

For a stained histological section for example, the use of an empirical calibration parameter makes possible to take into account the experience of histology practitioners about which pixels they consider as "stained" and "non-stained". In such a case, the "preparation" preferably includes a staining.

If an empirical calibration parameter is used in the determination of the classification condition, it is preferably taken into account in the determination of the classification condition from the at least one fitting parameter.

In an embodiment of the invention, the distribution(s) of the set are fitted with Gaussian distribution(s).

The at least one fitting parameter preferably comprises the mean(s) of the Gaussian distribution(s). The at least one fitting parameter preferably comprises the mean(s) and the standard deviation of the Gaussian distribution(s). The determination of the classification condition from the at least one fitting parameter preferably involves a weighted sum of the mean and the standard deviation. If an empirical calibration parameter is used in the determination of the classification condition, it is preferably taken into account in at least one weight of said weighted sum.

In an embodiment of the invention, the fit uses a Gaussian mixture model. This model is able to adapt especially well to histogram changes.

In an embodiment of the invention, the fit uses a maximum likelihood method.

The fit may also be performed with another method, like the mean square method. The inventors have found that using the maximum likelihood method provides better results than other methods because the parameter estimates are made from a subsampled pixel set. It is especially very well adapted to the wide virtual slide (WSI).

For example, the fit can be performed with a sum of bidimensional Gaussian functions.

In an embodiment of the invention, the process comprises classifying in a second class pixels of the second digital image that do not fulfill the classification condition.

For example, these pixels can be considered as unstained or can be considered as stained in another color or can be considered as having another color. In an embodiment of the invention, the pixels that do not fulfill the classification condition are classified amongst a plurality of classes, for example based on a further classification condition. It is thus possible to classify the pixels in the first class (first color or first staining color), a second class (second color or second staining color) and a third class (third color or no staining).

In an embodiment of the invention, the process comprises a determination of the matrix A from a principal component analysis, from an independent component analysis, or from a factorial analysis on the matrix X. Indeed, it is interesting to focus on the dimensions that do represent relevant information, in order to perform the fit(s) on the coefficient of matrix I that focalize the most relevant information. Another possibility is that the matrix A is known ahead of the process.

In an embodiment of the invention, called the Ohta's embodiment, n=3, m=3, X, is a red value R in the first digital image, $X_2$ is a green value G in the first digital image, and $X_3$ is a blue value B in the first digital image, and $$A = \begin{bmatrix} \frac{1}{3} & \frac{1}{3} & \frac{1}{3} \\ \frac{1}{2} & 0 & -\frac{1}{2} \\ -\frac{1}{4} & \frac{1}{2} & -\frac{1}{4} \end{bmatrix}$$

In the Ohta's embodiment of the invention, the equation used for the change of color space of step (b) is based on a principal component analysis, as demonstrated by Ohta in his publications. Therefore, the separation between colors is much stronger in the color space of the second digital image, which can be called "second color space" or "Ohta color space". Therefore, the process according to the invention is especially suitable for discriminating pixels of different colors, which increases its classification accuracy.

Moreover, because the classification condition is based on the intensity of the pixels in the second color space, $I_1$, and on at least another color value, $I_2$, $I_3$, of the pixels. The use of $I_1$ is especially suitable to discriminate between signal and background. The use of $I_2$ or $I_3$ is especially suitable to discriminate between colors. The uses of $I_1$ and $I_2$ or $I_3$ bring therefore complementary pieces of information. The combination of the uses of $I_1$ with $I_2$ or $I_3$ leads thus to a strong improvement on the accuracy of the process.

The inventors have shown that the combination of $I_1$ with $I_2$ and/or $I_3$ in the Ohta space is for example especially efficient to differentiate between brown and blue colors, and it can be very efficient to also differentiate between other colors.

In the first picture, three values are associated with each pixel: a value in red, a value in green and a value in blue. The first picture can be said to be in a first color space that is a red green blue (RGB) color space. In the second picture, three values are associated with each pixel: a value in I, a value in $I_2$ and a value in $I_3$. The second picture can be said to be in a second color space. The second color space is not an RGB color space. The second color space may be called an Ohta color space.

The color value $I_1$ can be called "intensity". The color value $I_2$ can be called "red against blue". The color value $I_3$ can be called "magenta against green".

In an embodiment of the invention, the first digital image shows at least part of the biological sample stained according to a first staining technique. This part of the biological sample is preferably a first histological section. The first digital image is preferably in RGB. It is possible that the first digital image is level of grey, for example if it is an image in in fluorescence or an image in polarization.

In the frame of the present document, a first staining technique preferably differs from a second staining technique by the chemicals used for the coloration.

In an embodiment of the invention, the further digital image shows at least part of the biological sample stained according to a second staining technique. In such a case, the process according to the invention makes possible to combine information provided by several staining techniques to obtain a common condition or criterion for the classification of pixels. The part of the biological sample visible on the further digital image may be a second histological section, or the first histological section that has been unstained, and stained according to the second staining technique.

In an embodiment of the invention, the first digital image is obtained from an optical image, an image in fluorescence or an image in polarization. Any other imaging technique is also possible within the frame of the invention. The further digital image may be obtained from any of an optical image, an image in fluorescence or an image in polarization. By "obtained from", it is meant that the digital image can be the optical image, the image in fluorescence, the image in polarization, a combination of at least two of these images, or an image that contains information coming from at least one of these images. An "optical image" preferably means an image in visible light, more preferably in color.

In an embodiment of the invention, $X_2$ is obtained from the further digital image and at least one $X_i$ with i>2 is obtained from an other digital image. For example, $X_2$, $X_3$ and $X_4$ may have basis in the further digital image and $X_5$, $X_6$ and $X_7$ may have basis in the other digital image.

In an embodiment of the invention, $X_1$ is obtained from a combination of the first digital image with an other digital image and at least one $X_i$ for 2≤i≤n is obtained from a combination of the further digital image with the other digital image. For example, information from the first digital image and the other digital image may be combined to give $X_1$, $X_2$ and $X_3$ and information from the further digital image and the other digital image may be combined to give $X_4$, $X_5$ and $X_6$.

The classification condition determined at step (c) can be reused later for other biological samples.

The invention relates also to a data processing device comprising means for carrying out a process according to any embodiment of the invention.

The invention relates also to a computer program comprising instructions which, when the program is executed by a data processing device, cause the data processing device to carry out a process according to any embodiment of the invention. The data processing device may be a computer, a tablet, a smartphone, a controller, a processor and may be included in any type of device.

The invention relates also to a computer-readable medium comprising instructions which, when executed by a data processing device, cause the data processing device to carry out a process according to any embodiment of the invention.

BRIEF DESCRIPTION OF THE FIGURES

For a better understanding of the present invention, reference will now be made, by way of example, to the accompanying drawings in which:

FIG. 1a illustrates a flow-chart illustrating a first example of a process for classifying pixels according to an embodiment of the invention;

FIG. 1b illustrates a flow-chart illustrating a second example of a process for classifying pixels according to an embodiment of the invention;

FIG. 5 illustrates a first digital image in a first example of the first embodiment of the present invention;

FIG. 6a is a zoom on a part of the first digital image of FIG. 5;

FIG. 6b illustrates a part of the second digital image that corresponds to the part of the first digital image illustrated at FIG. 6a;

FIG. 10a illustrates borders between "stained" and "unstained" areas that are obtained without the empirical calibration parameters;

FIG. 10b illustrates borders between "stained" and "unstained" areas that are obtained with the use of the empirical calibration parameters as described herein;

FIG. 11 illustrates an image resulting from a classification according to the present invention, in the first example of the first embodiment of the present invention;

FIG. 18b illustrates a part of the second digital image that corresponds to the part of the first digital image illustrated at FIG. 18a;

FIG. 21b illustrates the same picture as FIG. 21a, wherein the different types of dots indicate whether the histology practitioner has considered the point indicated by the dot as stained or as unstained;

FIG. 22a illustrates borders between "stained" and "unstained" areas that are obtained without the empirical calibration parameters;

FIG. 22b illustrates borders between "stained" and "unstained" areas that are obtained with the use of the empirical calibration parameters as described herein;

FIG. 30b illustrates the part of the second digital image that corresponds to the part of the first digital image illustrated at FIG. 30a;

FIG. 31b illustrates four Gaussian curves that fit the bidimensional distribution of FIG. 31a;

FIG. 32 illustrates the result of an analysis with the four ellipses of FIG. 31b;

FIG. 33a is a zoom on a given area on FIG. 29;

FIG. 33b is a zoom on the same area as FIG. 33a, on FIG. 32;

FIG. 34 illustrates a tiling of FIG. 32 with hexagonal macro-pixels;

FIG. 35 illustrates the macro-pixels with a color that corresponds to their amount of collagen;

FIG. 36 illustrates the macro-pixels with a color that corresponds to their amount of cytoplasm;

DESCRIPTION OF THE INVENTION

Figure 2:
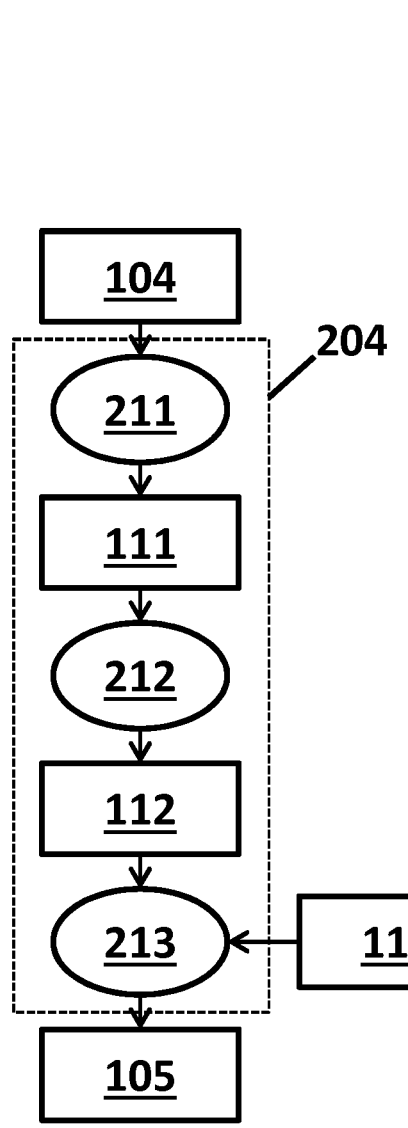
FIG. 2 is a flowchart illustrating an exemplary embodiment of the determination of the classification condition according to the invention.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

On the figures, identical or analogous elements may be referred by a same number.

FIG. 1a illustrates a flow-chart illustrating an example of a process 100 for classifying pixels according to an embodiment of the invention wherein no further digital image is used. Preferably, a biological sample 101 is stained 201. The result is a stained biological sample 102. Then, a picture is made of at least part of the biological sample 101 or of at least part of the stained biological sample 102 to provide 202 to a device comprising data processing means a first digital image 103 representing at least part of the biological sample 101 with or without staining.

The first digital image 103 comprises pixels. The first digital image 103 is in a first space with n dimensions (n≥2), and each pixels has n values called $X_1$ to $X_n$. In the embodiment of in the invention wherein only the first digital image 103 is used to determine X, values $X_2$ to $X_n$ are obtained 202b together with value $X_1$, at step 202, because these values are included in the first digital image 103.

The first space is preferably a color space, and more specifically an RGB color space. Three color values are thus associated with each pixel of the first digital image 103: a value in red R (=$X_1$), a value in green G (=$X_2$) and a value in blue B (=$X_3$).

According to the process 100, a change 203 of space (or of color space) is then performed, for example starting from the RGB values of the pixels of the first digital image 103. The change 203 of color space comprises to determine a second digital image 104 in a second color space by performing, for each pixel, the following matrix multiplication $$I = A \times X$$

The matrix A is the same for all pixels. The component $I_1$ to $I_m$ of the matrix I are the values of the pixels in the second digital image 104, with m≥2.

In the Ohta's embodiment of the invention, the color values of the pixels in the second digital image 104 are $I_1$, $I_2$ and $I_3$. They are determined by:

$$\begin{bmatrix} I_1 \\ I_2 \\ I_3 \end{bmatrix} = \begin{bmatrix} \frac{1}{3} & \frac{1}{3} & \frac{1}{3} \\ \frac{1}{2} & 0 & -\frac{1}{2} \\ -\frac{1}{4} & \frac{1}{2} & -\frac{1}{4} \end{bmatrix} \times \begin{bmatrix} R \\ G \\ B \end{bmatrix}$$

A classification condition 105 is then determined 204. This determination 204 is based on:
the values in $I_1$ of at least some pixels of the second digital image 104, together with
the values of at least one $I_j$ (with m≥j>1) of at least some pixels of the second digital image 104.

In the Ohta's embodiment of the invention, this determination 204 is based on:
the values in $I_1$ of at least some pixels of the second digital image 104, together with
the values in $I_2$ and/or the values in $I_3$ of at least some pixels of the second digital image 104.

The values in $I_1$ are especially useful to distinguish the pixels of interest. The values in $I_2$ or $I_3$ are especially useful to discriminate the color or staining. The combination of $I_1$ with $I_2$ or $I_3$ makes possible to accurately determine the colored or stained pixels of interest.

The classification condition 105 is preferably determined to represent the condition that only colored or stained pixels fulfill, while unstained pixels do not fulfill it.

Then, the pixels of the second digital image 104 that satisfy the classification condition 105 are then classified in a first class 106. In other words, these pixels are selected as being pixels belonging to the first class 106.

In an embodiment of the invention, the pixels of the first class 106 are used to form a third digital image, which is a mask, preferably a binary image or an image in grey scale. A first color in this binary image corresponds to pixels of the first class 106 and a second color in this binary image corresponds to pixels that are not of the first class 106.

The invention concerns also a process for biological image treatment that includes the classification process 100 and at least one of the following processes:
a determination of at least one empirical calibration parameter 113 (see for example FIG. 3);
a process of separation of the first digital image into a stromal compartment and a tumoral compartment;
an allocation of the pixels, preferably of the pixels of the first class 106, into macro-pixels; and
a further analysis based on the pixels of the first class 106.

In an embodiment of the invention, the process of separation of the first digital image into a stromal compartment and a tumoral compartment determines a binary mask that can be superimposed on the third binary image and only pixels that are from the tumoral compartment and of the first class are selected.

Preferably, only those selected pixels are distributed into macro-pixels and/or are used for any further analysis.

The further analysis preferably involves a statistical analysis a function of the number of macro-pixels having a given properties.

FIG. 1b illustrates a flow-chart illustrating an example of a process 100 for classifying pixels according to an embodiment of the invention wherein a further digital image 103b is used. Preferably, a first histological section of a biological sample 101 is stained 201 according to a first staining technique. The result is a first stained histological section of a biological sample 102. Then, a picture is made of at least part of the first histological to provide 202 to a device comprising data processing means a first digital image 103 representing at least part of the first histological section. The first digital image 103 comprises pixels. Each pixels has at least, in the first digital image 103, one value, called $X_1$.

Then, or in parallel, a second histological section of the biological sample 101 is stained 201b according to a second staining technique. The result is a second stained histological section of a biological sample 102b. Then, a picture is made of at least part of the second histological section to provide to the device comprising data processing means the further digital image 103b representing at least part of the second histological section. The further digital image 103b includes values associated with its pixels. There is at least one value $X_i$ (i>1) associated with each pixel of the further digital image 103b that is obtained 202b by the device when the device receives the further digital image 103b. Preferably, each pixel of the further digital image 103b corresponds to a single pixel in the first digital image 103. For each pixel, there is a matrix of value of said pixel $X=(X_1, \ldots, X_n)^T$ that combines value(s) obtained from the first digital image 103 and value(s) obtained from the further digital image 103b.

The process then uses matrix X to proceed to steps 203 to 205 in a similar way as described with reference to FIG. 1a.

It is possible, within the frame of the present invention, that the first digital image 103 and/or the further digital image 103b is obtained from an optical image (in RGB for example), an image in fluorescence or in polarization. Any type of image would be actually suitable.

The process of FIG. 1a considers only the first digital image 103 as input for the digital treatment. The process of FIG. 1b considers the first digital image 103 and the further digital image 103b as inputs for the digital treatment. It is possible, within the frame of the present invention, that at least one other digital image is also used to obtain at least one component of X. For example, the first digital image 103 and the other digital image may be combined to obtain $X_1$ while the further digital image 103b and the other digital image may be combined to obtain $X_2$. Such a combination of images may be actually performed through a principal component analysis in order to directly extract the most relevant pieces of information from the images.

FIG. 2 is a flowchart illustrating an exemplary embodiment of the determination 204 of the classification condition 105 according to the invention.

According to this exemplary embodiment, a set 111 of one or several distribution(s) is determined 211. The set 111 comprises at least one distribution of a number of pixels in the second digital image 104 as function of $I_1$. The set 111 comprises at least one distribution of a number of pixels in the second digital image 104 as function of $I_j$ with m≥j>1, for example $I_2$ or $I_3$.

For example, the set 111 may comprise a first histogram that represents the number of pixels in the second digital image as function of the value of $I_1$ and a second histogram that represents the number of pixels in the second digital image as function of the value of $I_2$.

Then, in the embodiment illustrated at FIG. 2, the distribution(s) of the set 111 is (are) fitted 212 with parametrical functions in order to extract the parameter(s) 112 of these parametrical functions.

Then, in the embodiment illustrated at FIG. 2, in addition to the parameter(s) 112, the determination 204 takes into account 213 at least one empirical calibration parameter 113 to calculate the classification condition 105.

In an embodiment of the invention, steps 211 and 212 are performed, but step 213 is not performed. In other words, the classification condition 105 is determined without the use of an empirical calibration parameter 113 but with a fit 212 of a distribution.

Figure 3:
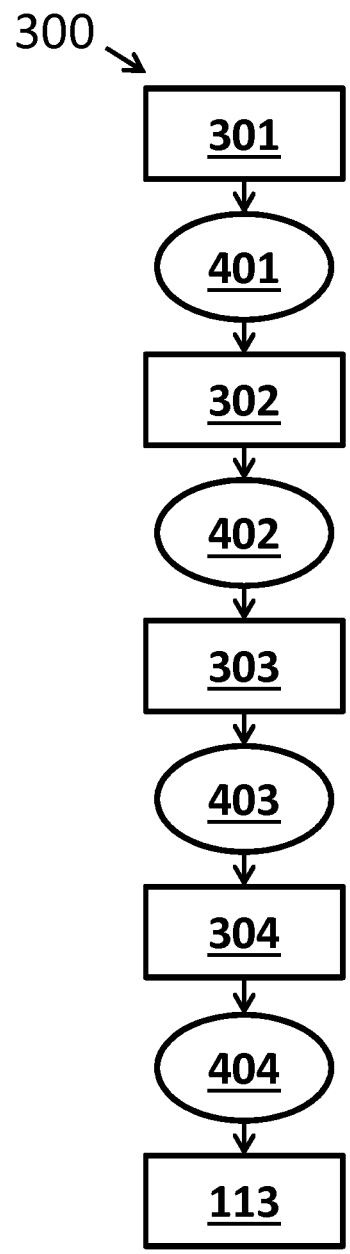
FIG. 3 is a flowchart illustrating an exemplary embodiment of a determination of at least one empirical calibration parameter according to the invention.

FIG. 3 is a flowchart illustrating an exemplary embodiment of a determination 300 of at least one empirical calibration parameter 113 according to the invention.

According to this exemplary embodiment, calibration biological samples 301 are stained or prepared 401 in the same way as the biological sample 102 analyzed by the classification process 100. They become stained or prepared calibration biological samples 302. Pictures of them are then taken 402, in RGB, and dots are placed on some pixels the pictures. The pictures with dots 303 are then shown 403 to biology practitioners, like medical doctors used to interpret biological samples. The biology practitioners give an indication of staining. The indication of staining can for example tells which dots the biology practitioners consider as stained/not stained or stained in a first color/stained in a second color/ . . . /not stained. The result 304 may have the format of a table with RGB values and indications of staining or color. The empirical calibration parameters 113 are then determined 404 based on the RGB values and the corresponding indications of staining or color. The practitioner dots are intersected with the two masks (or binary images), one for the labeled image (or stained/colored image) and the other for not labeled image. When a labeled dot is associated to its mask (or binary image) is counted as true otherwise as false. A score is computed determining the first and/or the second calibration parameters.

Figure 4:
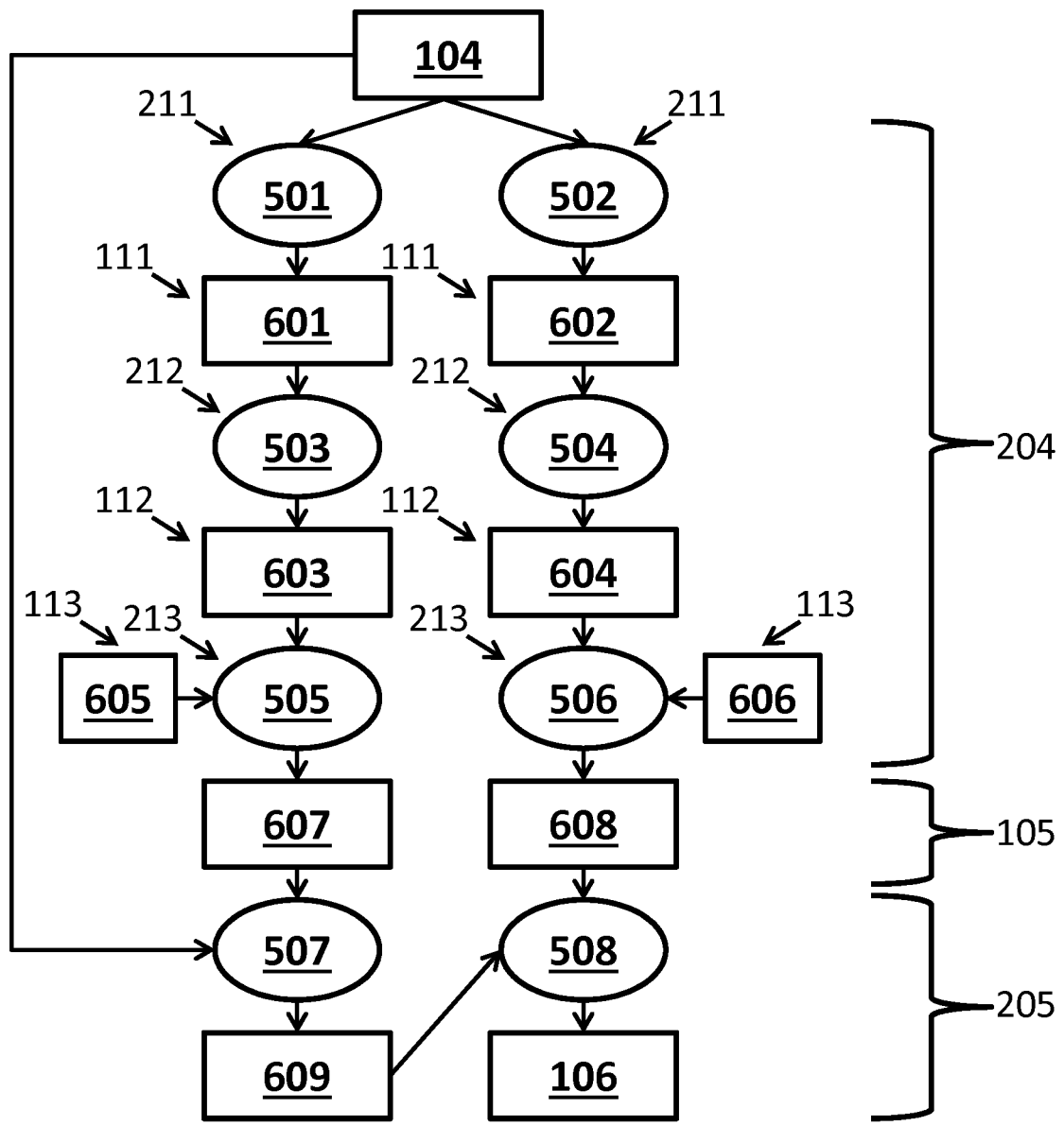
FIG. 4 is a flowchart illustrating an exemplary embodiment of the steps of determining the classification condition and classifying the pixels in a first class according to the invention.

FIG. 4 is a flowchart illustrating an exemplary embodiment of the steps of determining 204 the classification condition 105 and classifying the pixels 205 in a first class 106 according to the invention. In the description of FIG. 4, it has to be understood that index J is an integer strictly greater than 1, and equal to or smaller than m, m being the number of elements in the matrix I.

The skilled person will understand that some of the steps illustrated at FIG. 4 as parallel can be performed sequentially, or the opposite.

According to this exemplary embodiment, the determination 211 of the set 111 of one or several distribution(s) comprises a determination 501 of a first histogram 601, which is a histogram in $I_1$, and a determination 502 of a second histogram 602, which is a histogram in $I_j$. The set 111 comprises the first 601 and the second 602 histograms.

Then, at step 212, the first histogram 601 is fitted using a Gaussian Mixture Model with the sum of a first $I_1$ Gaussian curve and a second $I_1$ Gaussian curve. The first $I_1$ Gaussian curve preferably corresponds to stained/colored signal in the $I_1$ scale and the second $I_1$ Gaussian curve corresponds to background in the $I_1$ scale. The first $I_1$ Gaussian curve typically reaches much higher value than the second $I_1$ Gaussian curve. The first $I_1$ Gaussian curve is written as $$f(I_1) = A_1 \exp\left(-\frac{(I_1 - \mu_1)^2}{2\sigma_1^2}\right)$$

wherein $\mu_1$ and $\sigma_1$ 603 are some of the fitting parameters 112.

At step 212, the second histogram is fitted using a Gaussian Mixture Model with the sum of a first $I_j$ Gaussian curve and a second $I_j$ Gaussian curve. The first $I_j$ Gaussian curve preferably corresponds to stained/colored signal in the $I_j$ scale and the second $I_j$ Gaussian curve corresponds to background in the $I_j$ scale. The first $I_j$ Gaussian curve typically reaches much higher value than the second $I_j$ Gaussian curve. The first $I_j$ Gaussian curve is written as $$f(I_j) = A_2 \exp\left(-\frac{(I_j - \mu_j)^2}{2\sigma_j^2}\right)$$

wherein $\mu_j$ and $\sigma_j$ 604 are some of the fitting parameters 112.

At step 213, a first calibration parameter $ITC_1$ 605 is taken into account 505 to determine a first threshold $IT_1$ as $IT_1 = \mu_1 + ITC_1 * \sigma_1$, and a second calibration parameter $ITC_j$ is taken into account 506 to determine a second threshold as $IT_j = \mu_j + ITC_j * \sigma_j$.

The classification condition 105 consists in:
  a first specific condition 607 which is $I_1 > IT_1$, and
  a second specific condition 608 which is $I_j > IT_j$.
The classification step 205 comprises:
  a comparison 507 of the pixels of the second digital image 104 with the first threshold IT1, selecting only the pixels 609 wherein $I_1 > IT_1$; and
  a comparison 508 of the selected pixels with the second threshold $IT_j$, classifying in the first class 106 only the pixels wherein $I_j > IT_j$.

FIG. 4 is an exemplary process of a first embodiment of the invention. In the first embodiment of the invention, the set of distribution(s) comprises a first distribution that provides the number of the pixels in the second digital image as function of their value in $I_1$ and a second distribution that provides the number of pixels in the second digital image as function of their value in $I_j$ with j>1. The first embodiment of the invention is illustrated by examples 1 and 2.

According to a second embodiment of the invention, the set of distribution(s) comprises a distribution that provides the number of the pixels in the second digital image as function of their value in $I_1$ and as function of at least one of their value in $I_j$ with $2 \leq j \leq m$. This multidimensional distribution is preferably fit with a sum of at least two or three Gaussians. The Gaussian mixture model can be used for the fit.

In two or more dimensions, the Gaussians resulting from the fit can be represented by ellipses. There might be for example a first ellipse corresponding to the stained/colored pixels, a second ellipse corresponding to the non-stained/colored pixels and a third ellipse corresponding to the background. The ellipses may be classified by their surface: the ellipse with the greater surface has the smaller priority and the ellipse with the smaller surface has the higher priority. The empirical calibration parameters can be taken into account by increasing or decreasing the length of the major and the minor axes of the ellipses by a multiplication. The second embodiment of the invention is illustrated by example 3.

Example 1

FIGS. 5 to 16 illustrate a first example of the first embodiment of the present invention. In this example, the staining of a histological section was performed with BIM.

FIG. 5 illustrates the first digital image 103 (FIG. 1). FIG. 6a is a zoom on a part of the first digital image 103 of FIG. 5. FIG. 6b illustrates the part of the second digital image 104 (FIG. 1) that corresponds to the part of the first digital image 103 illustrated at FIG. 6a.

Figure 7:
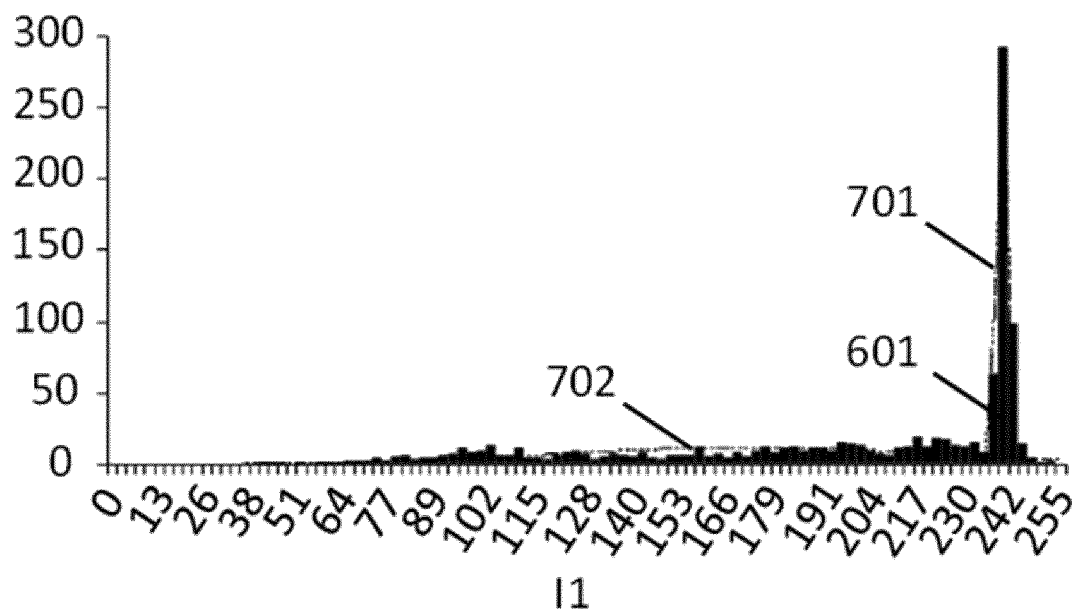
FIG. 7 illustrates the first histogram in the first example of the first embodiment of the present invention.
Figure 8:
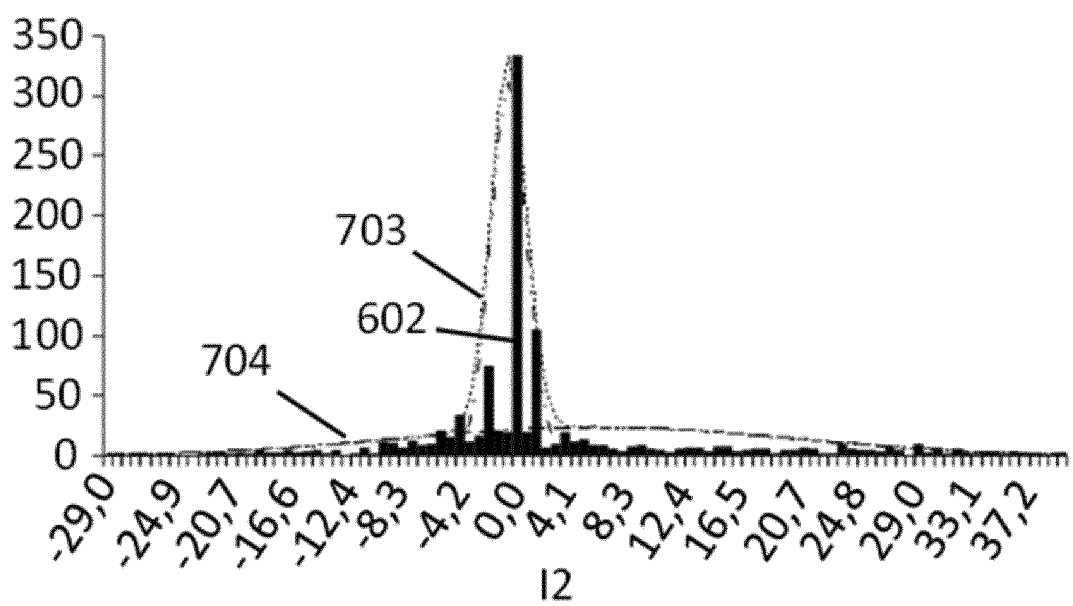
FIG. 8 illustrates the second histogram in the first example of the first embodiment of the present invention.

FIG. 7 illustrates the first histogram 601 (FIG. 4) with the fit as a sum of the first $I_1$ Gaussian curve 701 and the second $I_1$ Gaussian curve 702. FIG. 8 illustrates the second histogram 602 (FIG. 4) with the fit as a sum of the first $I_2$ Gaussian curve 703 and the second $I_2$ Gaussian curve 704.

Figure 9A:
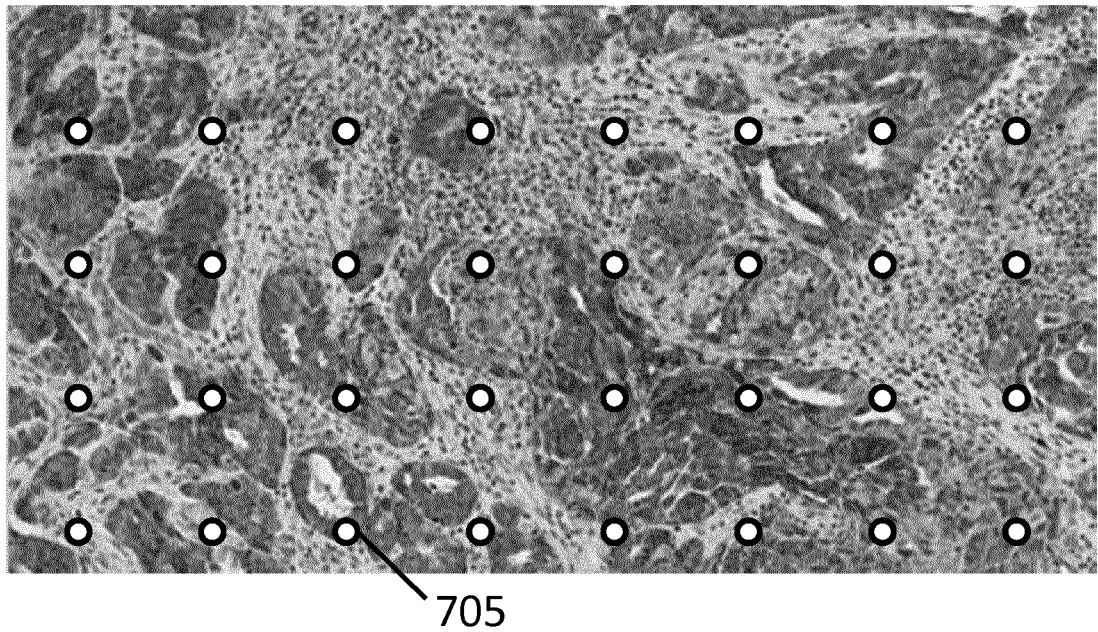
FIG. 9a illustrates a picture submitted to a histology practitioner in the first example of the first embodiment of the present invention.
Figure 9B:
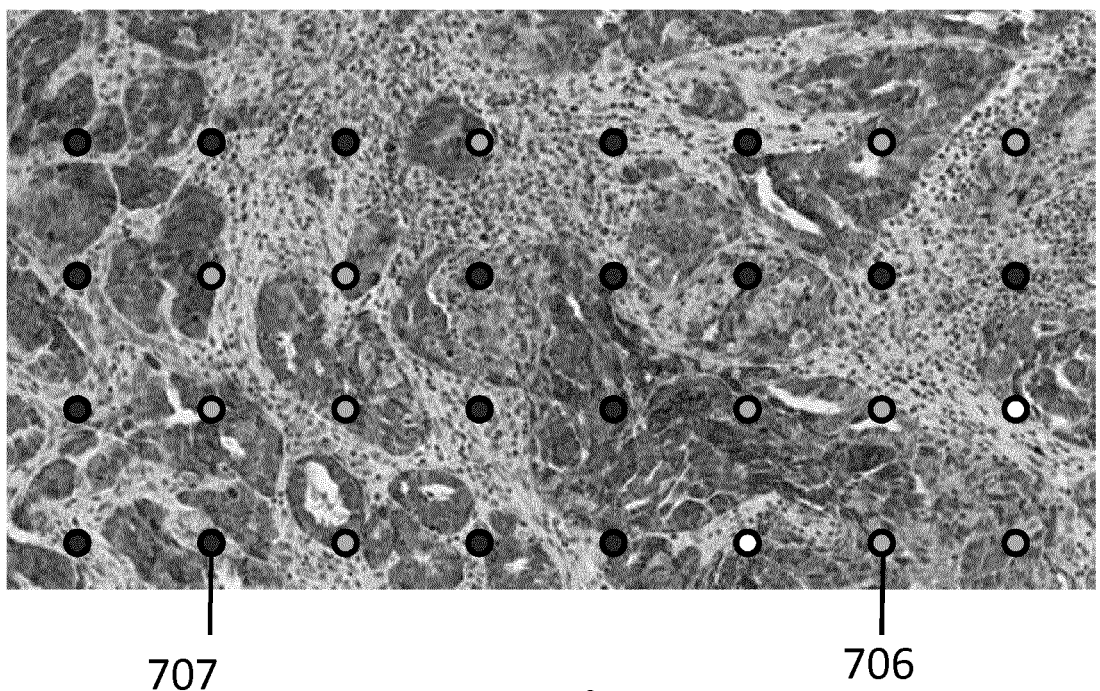
FIG. 9b illustrates the same picture as FIG. 9a, wherein the different types of dots indicate whether the histology practitioner has considered the point indicated by the dot as stained or as unstained.

FIG. 9a illustrates the picture 303 with dots 705 as submitted 403 to a histology practitioner (FIG. 3). FIG. 9b illustrates the picture 303 with dots, wherein the type of the dots indicates whether the histology practitioner has considered the point indicated by the dot as stained (light grey dot 706) or as unstained (dark grey dot 707). Dots that are still white correspond to pixels wherein the histology practitioner could not decide if they were stained or not.

FIG. 10a illustrates borders 809a between "stained" and "unstained" areas that are obtained without the empirical calibration parameters. FIG. 10b illustrates borders 809b between "stained" and "unstained" areas that are obtained with the use of the empirical calibration parameters as described herein. It is especially visible in the boxes 708a, 708b, 709a, 709b that the use of the empirical calibration parameters improves the classification.

FIG. 11 illustrates an image resulting from the classification 205: pixels in red are the pixels belonging to the first class 106 and pixels in green are the pixels not belonging to the first class 106. The process that was applied in this example, involved a selection of areas of interest and the black pixels are those that were not considered as part of the areas of interest.

Figure 12:
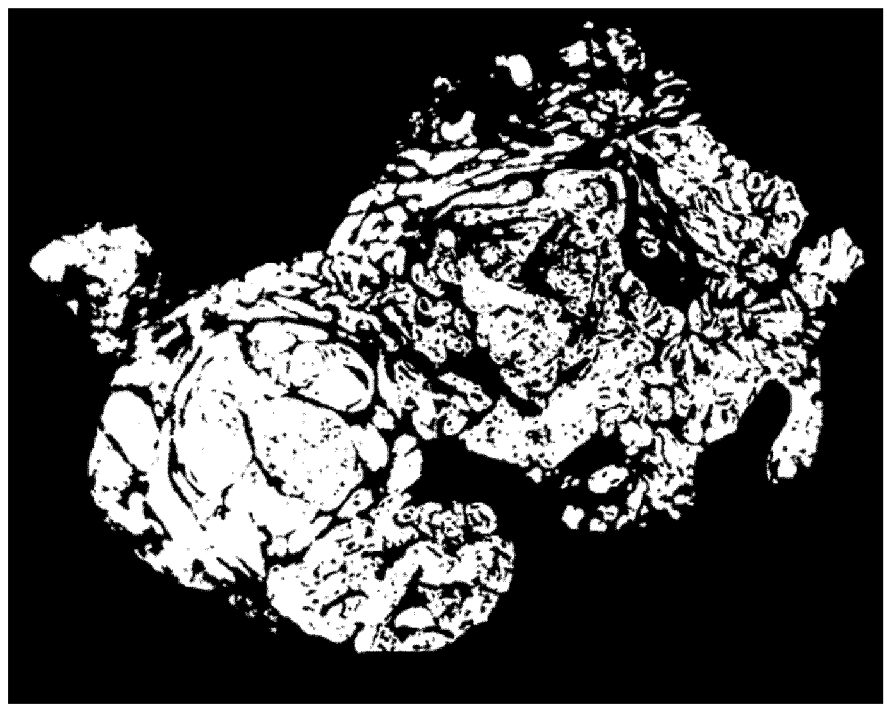
FIG. 12 illustrates a binary mask in the first example of the first embodiment of the present invention.

FIG. 12 illustrates a binary mask wherein the white pixels correspond to the tumoral compartment.

Figure 13:
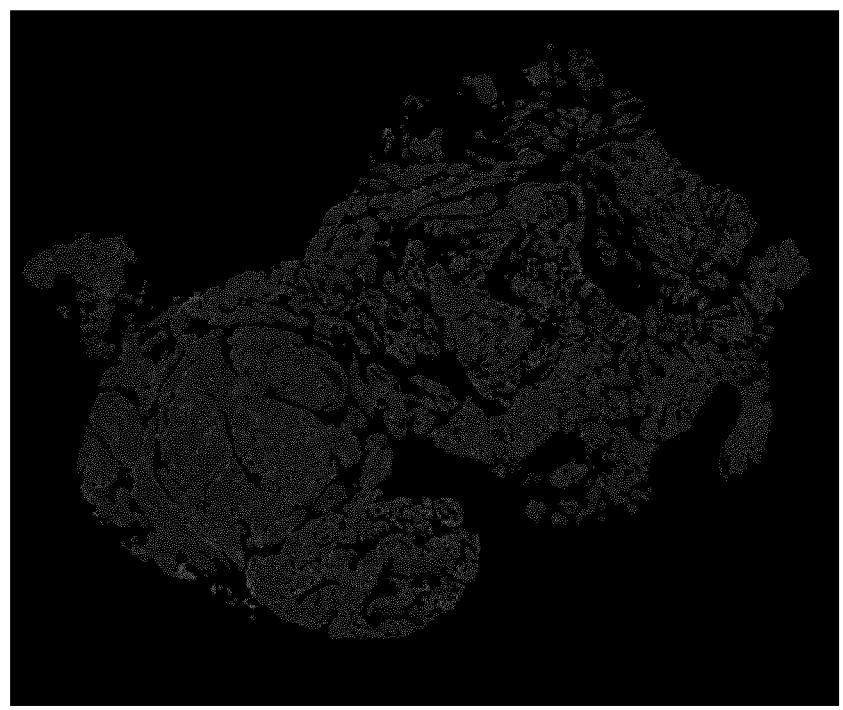
FIG. 13 illustrates the outcome of the application of the binary mask of FIG. 12 on the image resulting from the classification illustrated at FIG. 11.

FIG. 13 illustrates the outcome of the application of the binary mask of FIG. 12 on the image resulting from the classification 205 illustrated at FIG. 11.

Figure 14:
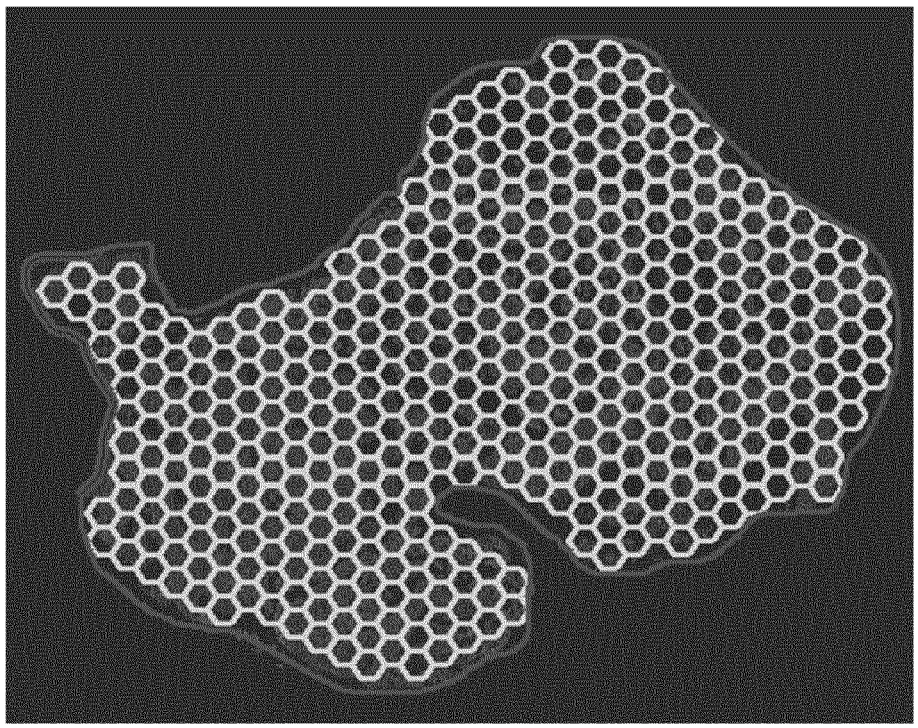
FIG. 14 illustrates a tiling of FIG. 13 with hexagonal macro-pixels.

FIG. 14 illustrates a tiling of FIG. 13 with hexagonal macro-pixels.

Figure 15:
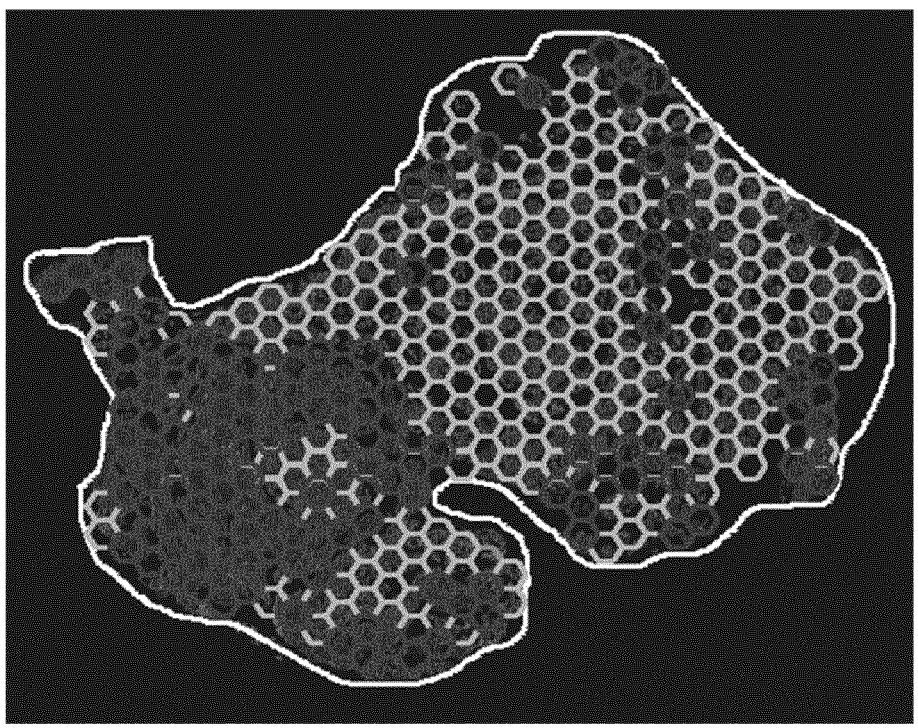
FIG. 15 illustrates the result of a calculation performed on the macro-pixels of FIG. 14.

FIG. 15 illustrates the result of a calculation performed on the macro-pixels of FIG. 14. The colors indicate the values obtained by this calculation.

Figure 16:
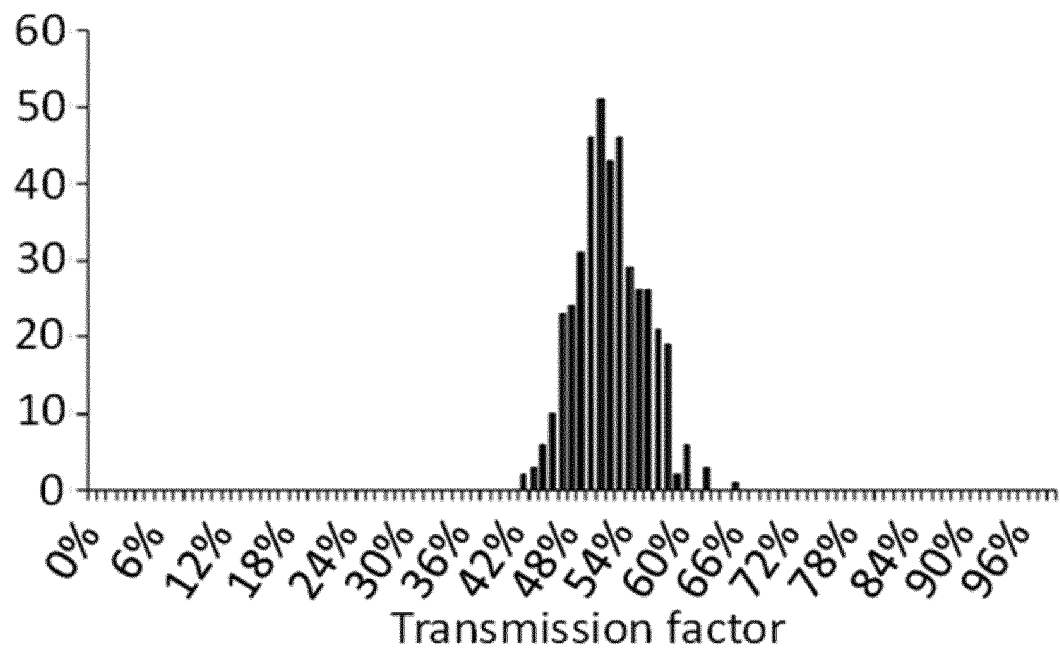
FIG. 16 illustrates a histogram providing the number of macro-pixels as function of the transmission factor.

FIG. 16 illustrates a histogram providing the number of macro-pixels as function of the transmission factor.

Example 2

FIGS. 17 to 28 illustrate a second example of the first embodiment of the present invention. In this example, a staining on a histological section was performed with P-ERK.

Figure 17:
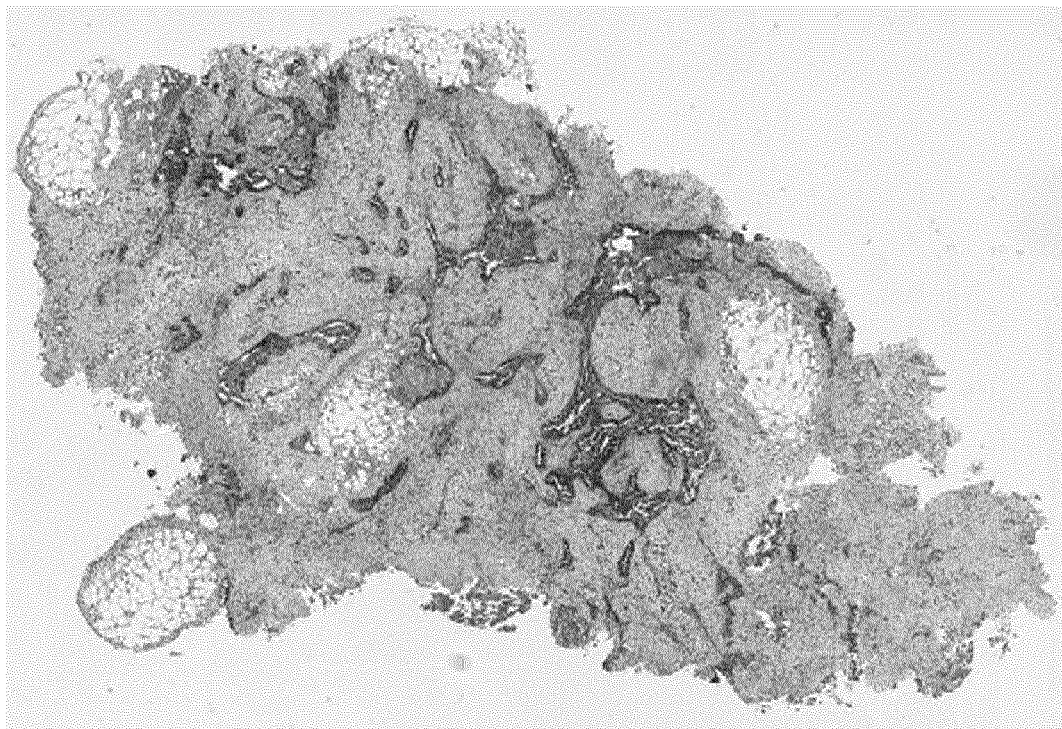
FIG. 17 illustrates a first digital image in a second example of the first embodiment of the present invention.
Figure 18A:
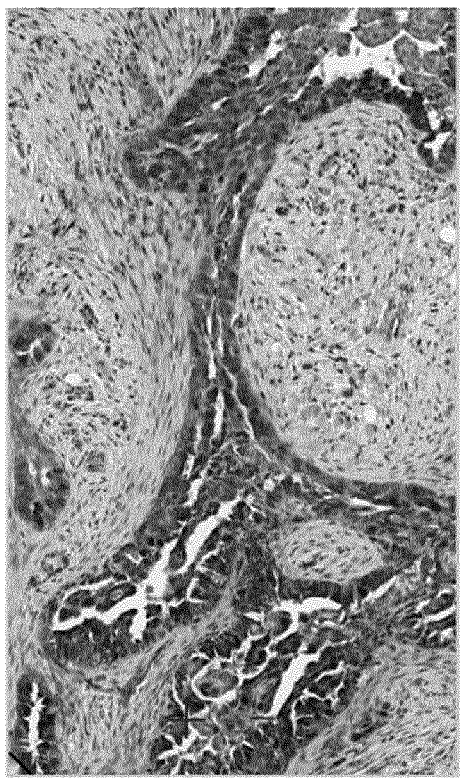
FIG. 18a is a zoom on a part of the first digital image of FIG. 17.
Figure 18B:
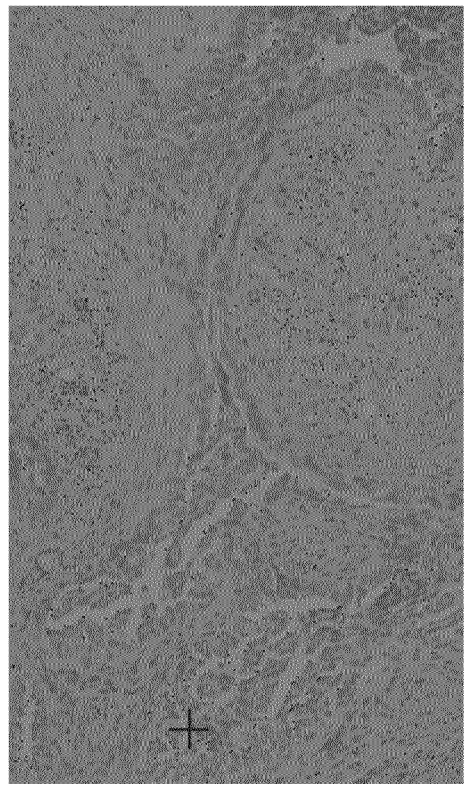

FIG. 17 illustrates the first digital image 103 (FIG. 1). FIG. 18a is a zoom on a part of the first digital image 103 of FIG. 17. FIG. 18b illustrates the part of the second digital image 104 (FIG. 1) that corresponds to the part of the first digital image 103 illustrated at FIG. 18a.

Figure 19:
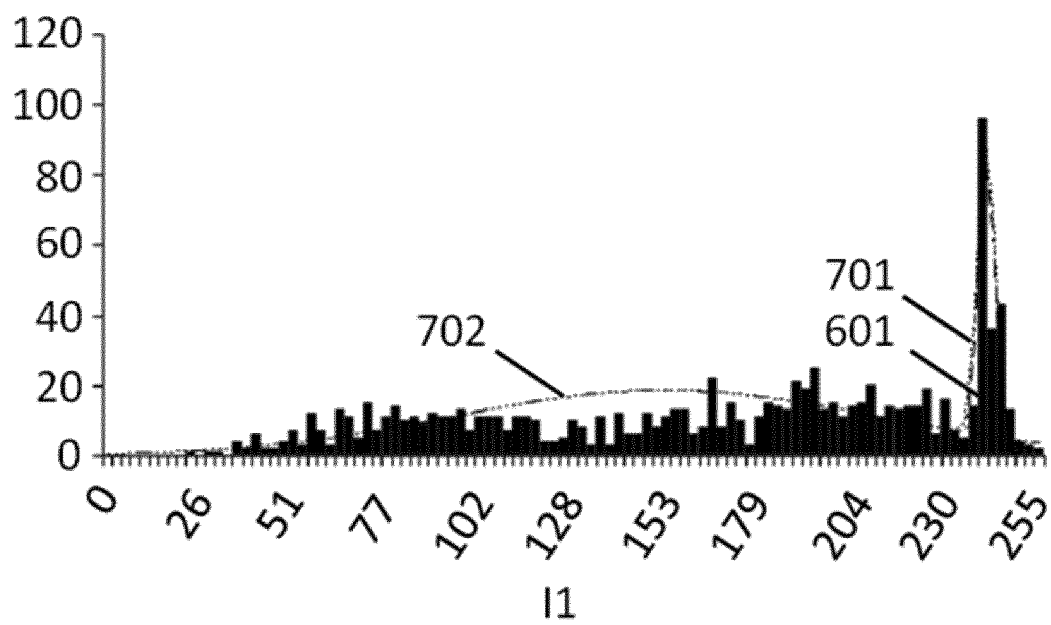
FIG. 19 illustrates the first histogram in the second example of the first embodiment of the present invention.
Figure 20:
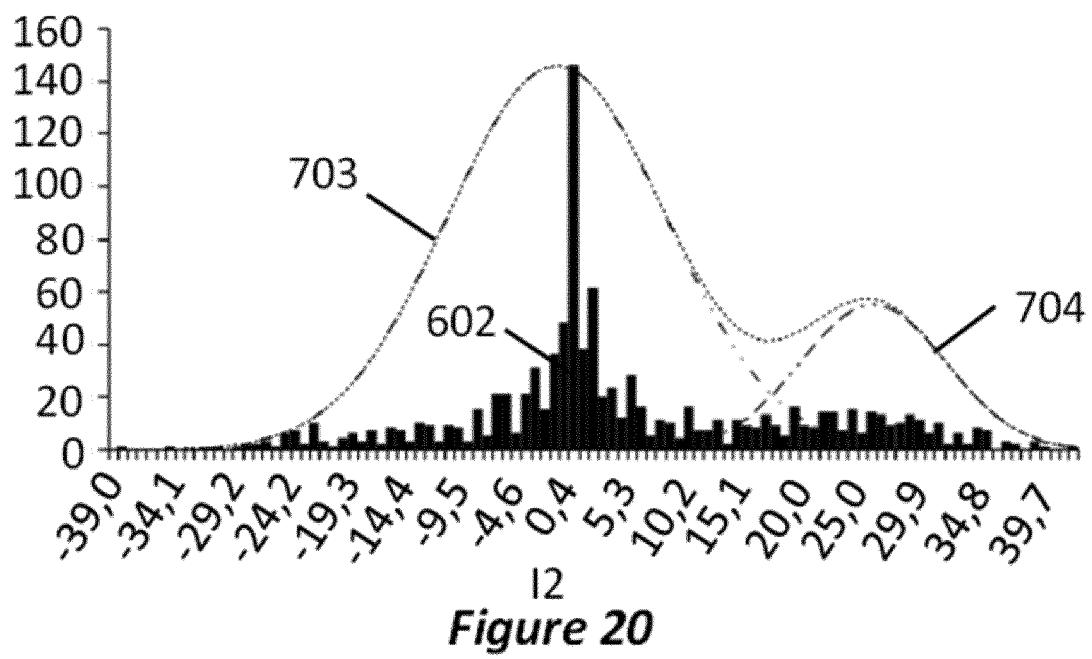
FIG. 20 illustrates the second histogram in the second example of the first embodiment of the present invention.

FIG. 19 illustrates the first histogram 601 (FIG. 4) with the fit as a sum of the first $I_1$ Gaussian curve 701 and the second $I_1$ Gaussian curve 702. FIG. 20 illustrates the second histogram 602 (FIG. 4) with the fit as a sum of the first $I_2$ Gaussian curve 703 and the second $I_2$ Gaussian curve 704.

Figure 21A:
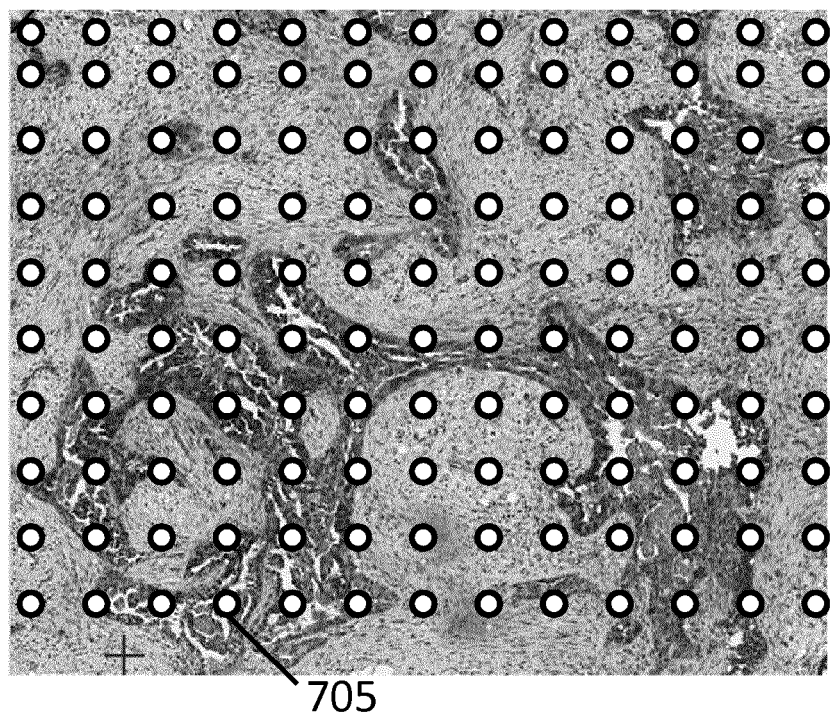
FIG. 21a illustrates a picture submitted to a histology practitioner in the second example of the first embodiment of the present invention.

FIG. 21a illustrates the picture 303 with dots 705 as submitted 403 to a histology practitioner (FIG. 3). FIG. 21b illustrates the picture 303 with dots, wherein the type of the dots indicates whether the histology practitioner has considered the point indicated by the dot as stained (light grey dot 706) or as unstained (dark grey dot 707). Dots that are still white correspond to pixels wherein the biology practitioner could not decide if they were stained or not.

FIG. 22a illustrates borders 809a between "stained" and "unstained" areas that are obtained without the empirical calibration parameters. FIG. 22b illustrates borders 809b between "stained" and "unstained" areas that are obtained with the use of the empirical calibration parameters as described herein. It is especially visible in the boxes 708a, 708b, 709a, 709b that the use of the empirical calibration parameters improves the classification.

Figure 23:
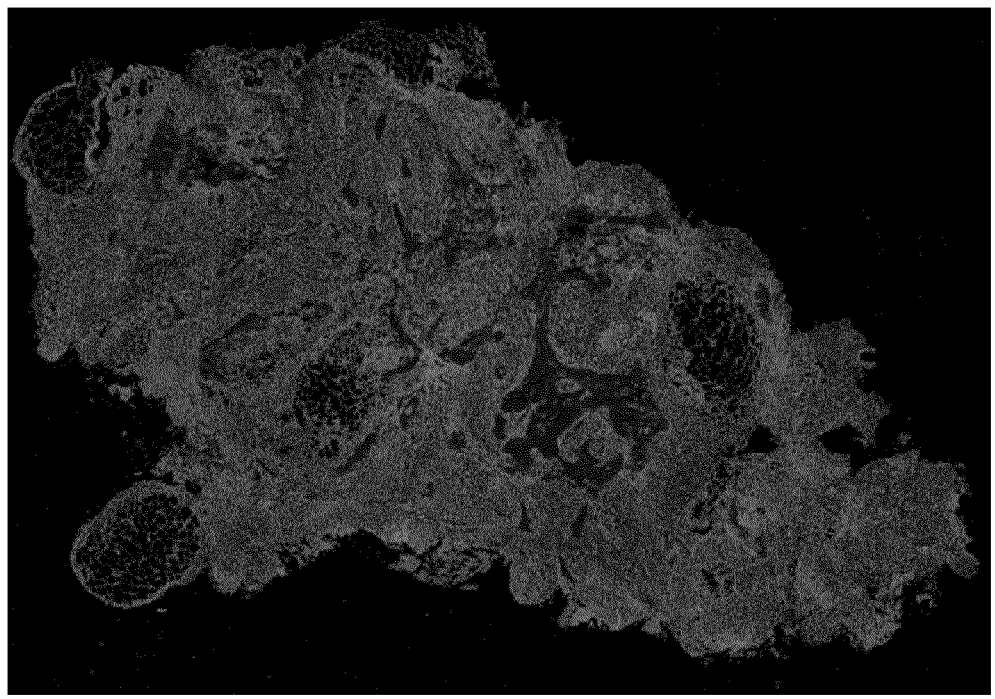
FIG. 23 illustrates an image resulting from the classification according to the present invention, in the second example of the first embodiment of the present invention.

FIG. 23 illustrates an image resulting from the classification 205: pixels in red are the pixels belonging to the first class 106 and pixels in green are the pixels not belonging to the first class 106. The process that was applied in this example$_2$ involved a selection of areas of interest and the black pixels are those that were not considered as part of the areas of interest.

Figure 24:
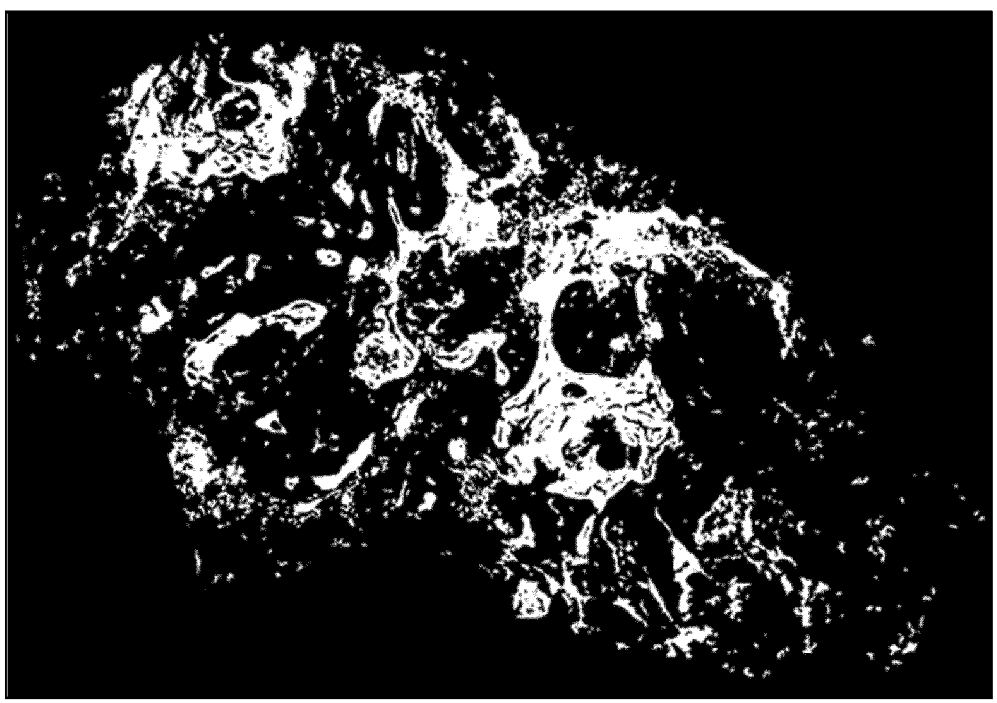
FIG. 24 illustrates a binary mask in the second example of the first embodiment of the present invention.

FIG. 24 illustrates a binary mask wherein the white pixels correspond to the tumoral compartment.

Figure 25:
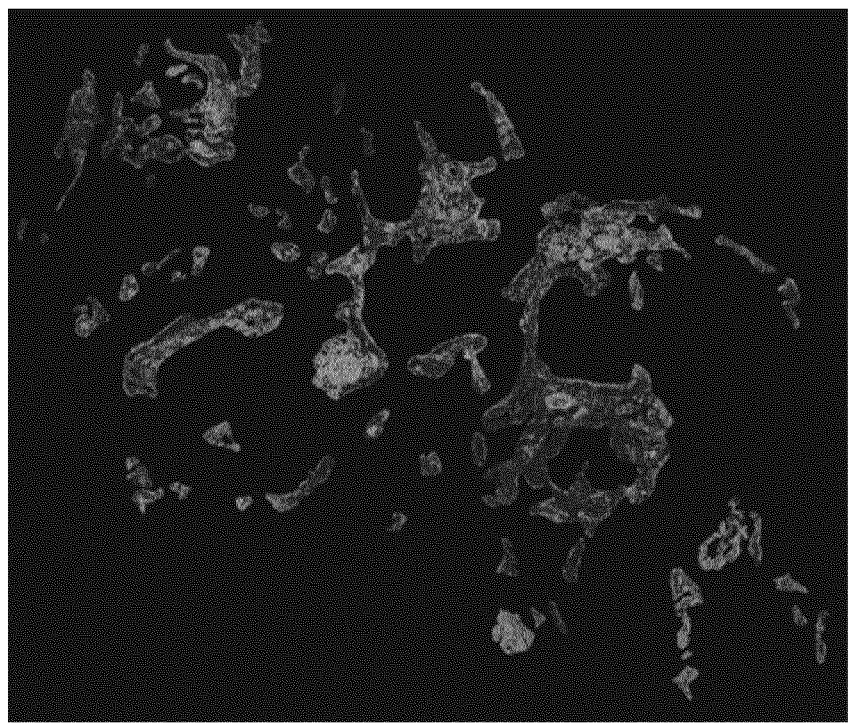
FIG. 25 illustrates the outcome of the application of the binary mask of FIG. 24 on the image resulting from the classification illustrated at FIG. 23.

FIG. 25 illustrates the outcome of the application of the binary mask of FIG. 24 on the image resulting from the classification 205 illustrated at FIG. 23.

Figure 26:
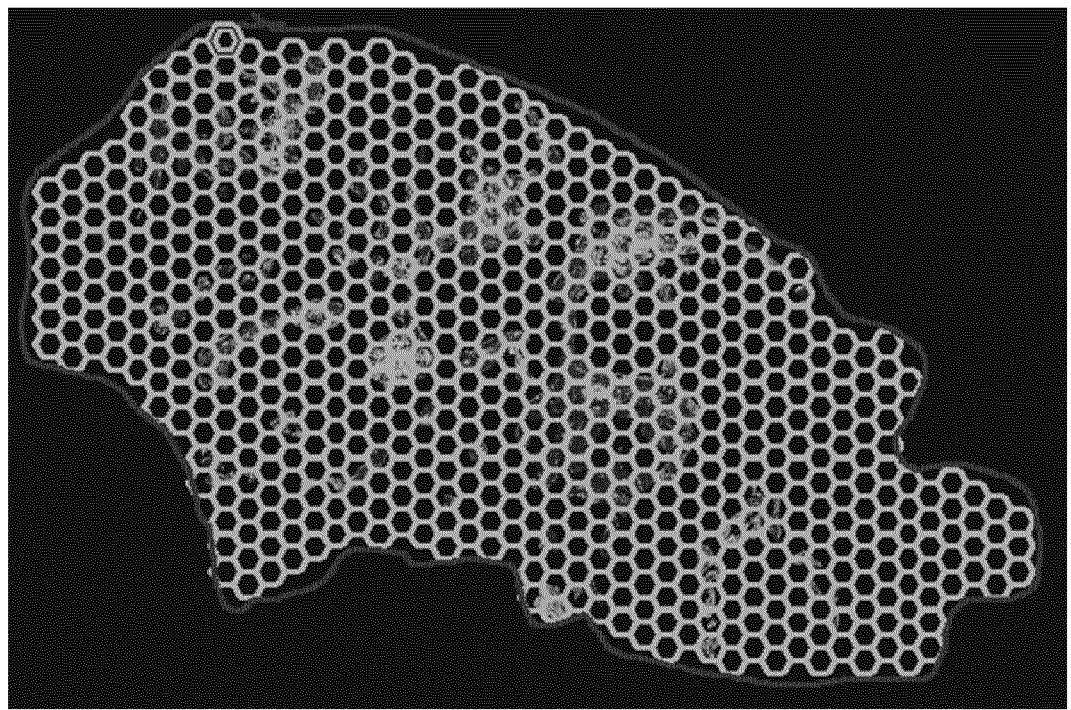
FIG. 26 illustrates a tiling of FIG. 25 with hexagonal macro-pixels.

FIG. 26 illustrates a tiling of FIG. 25 with hexagonal macro-pixels.

Figure 27:
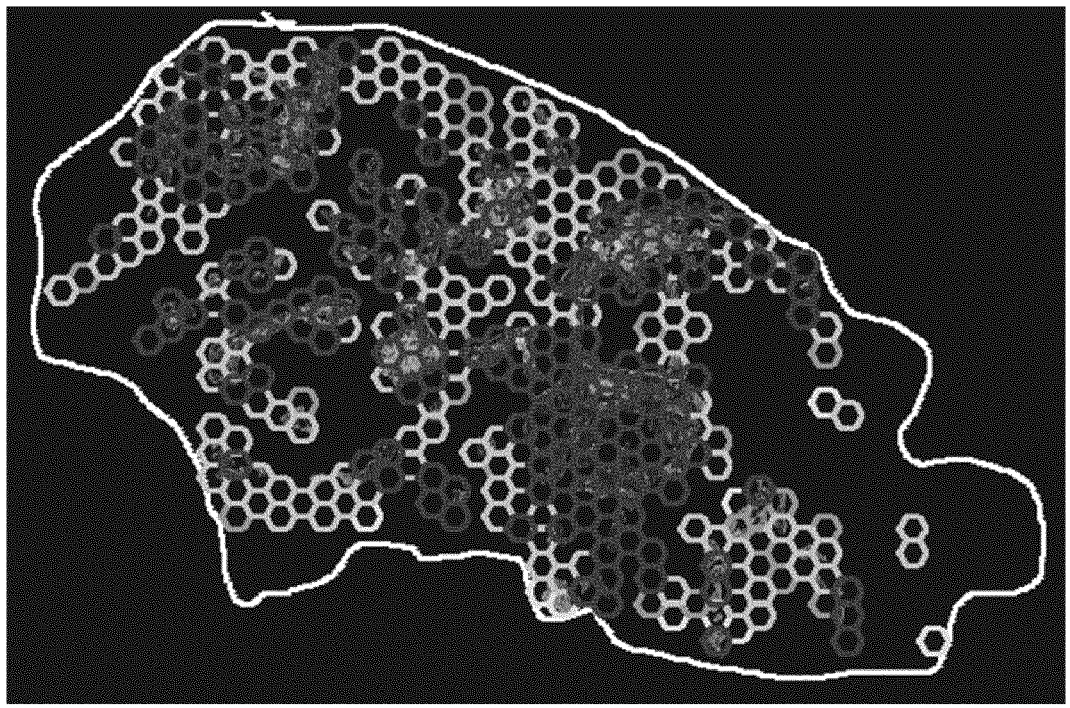
FIG. 27 illustrates the result of a calculation performed on the macro-pixels of FIG. 26.

FIG. 27 illustrates the result of a calculation performed on the macro-pixels of FIG. 26. The colors indicate the values obtained by this calculation.

Figure 28:
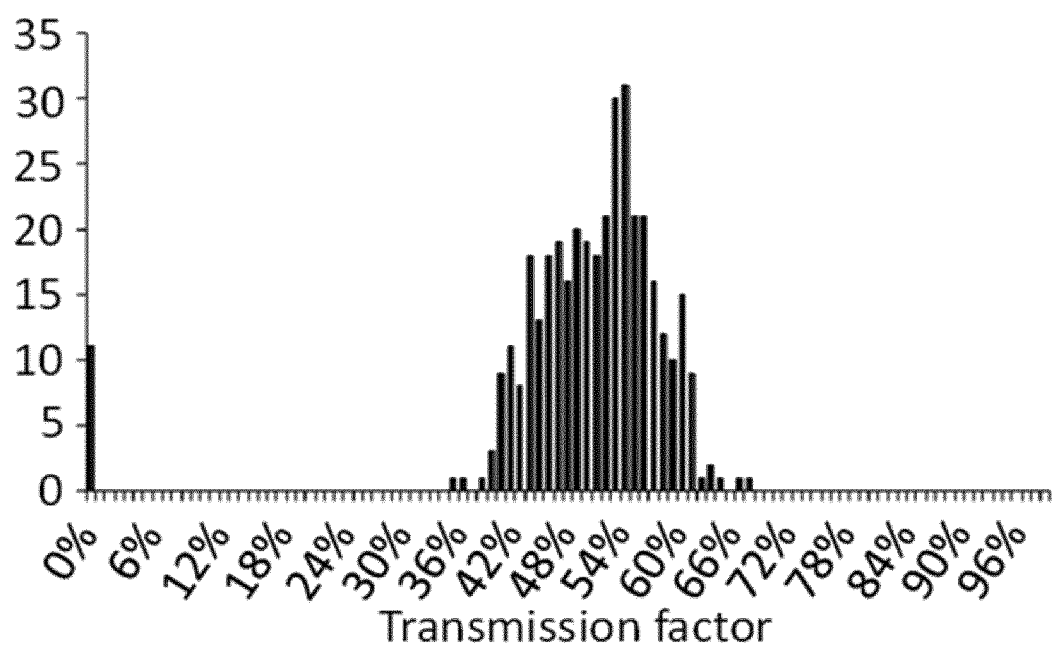
FIG. 28 illustrates a histogram providing the number of macro-pixels as function of the transmission factor.

FIG. 28 illustrates a histogram providing the number of macro-pixels as function of the transmission factor.

Example 3

FIGS. 29 to 38 illustrate an example of the second embodiment of the present invention. In this example, a staining on a histological section was performed with RGB3, with a trichrome wherein red corresponds to collagen fibers, cyan corresponds to cytoplasm and purple corresponds to nuclei.

Figure 29:
FIG. 29 illustrates a first digital image in an example of the second embodiment of the present invention.
Figure 30A:
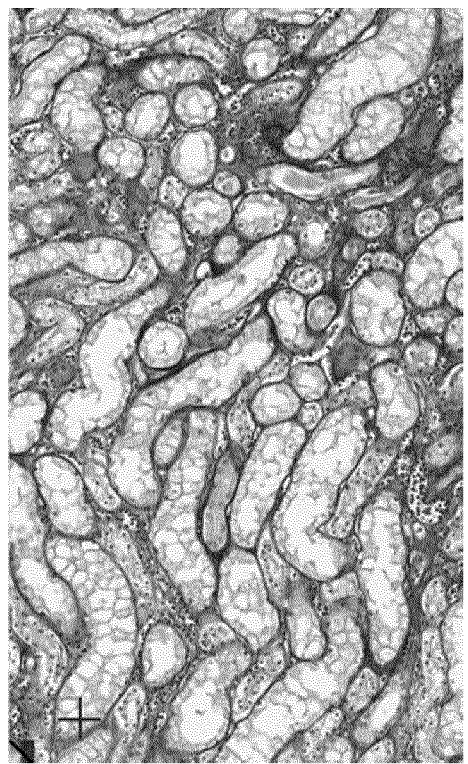
FIG. 30a is a zoom on a part of the first digital image of FIG. 29.
Figure 30B:
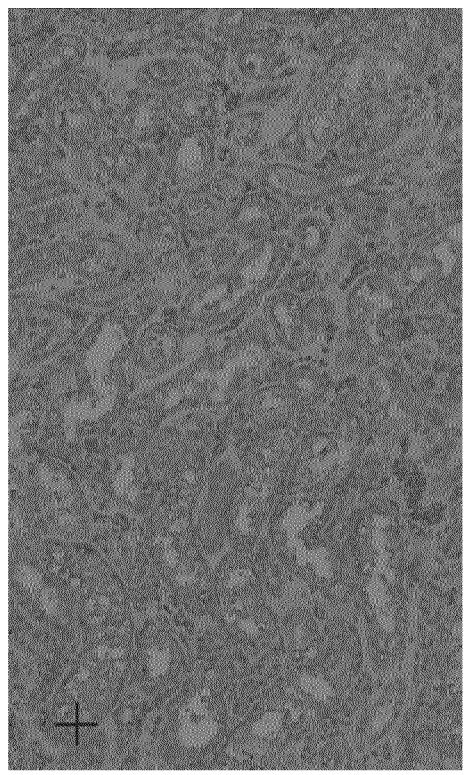

FIG. 29 illustrates the first digital image 103 (FIG. 1). FIG. 30a is a zoom on a part of the first digital image 103 of FIG. 29. FIG. 30b illustrates the part of the second digital image 104 (FIG. 1) that corresponds to the part of the first digital image 103 illustrated at FIG. 30a.

Figure 31A:
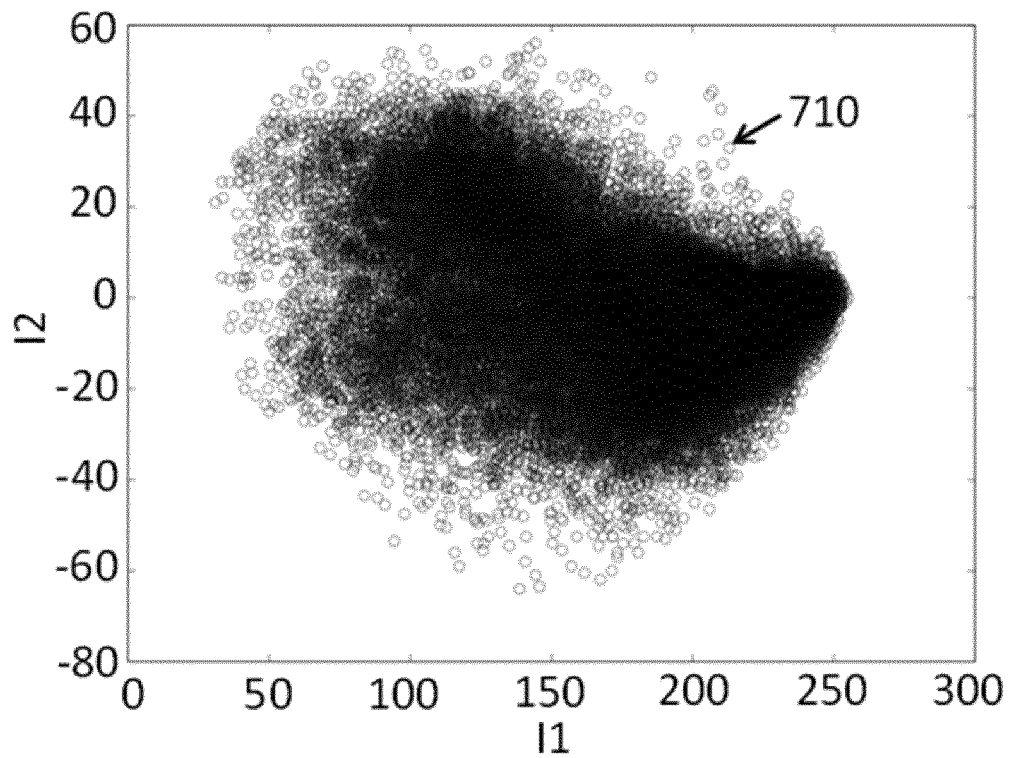
FIG. 31a illustrates a bidimensional distribution in the example of the second embodiment of the present invention.
Figure 31B:
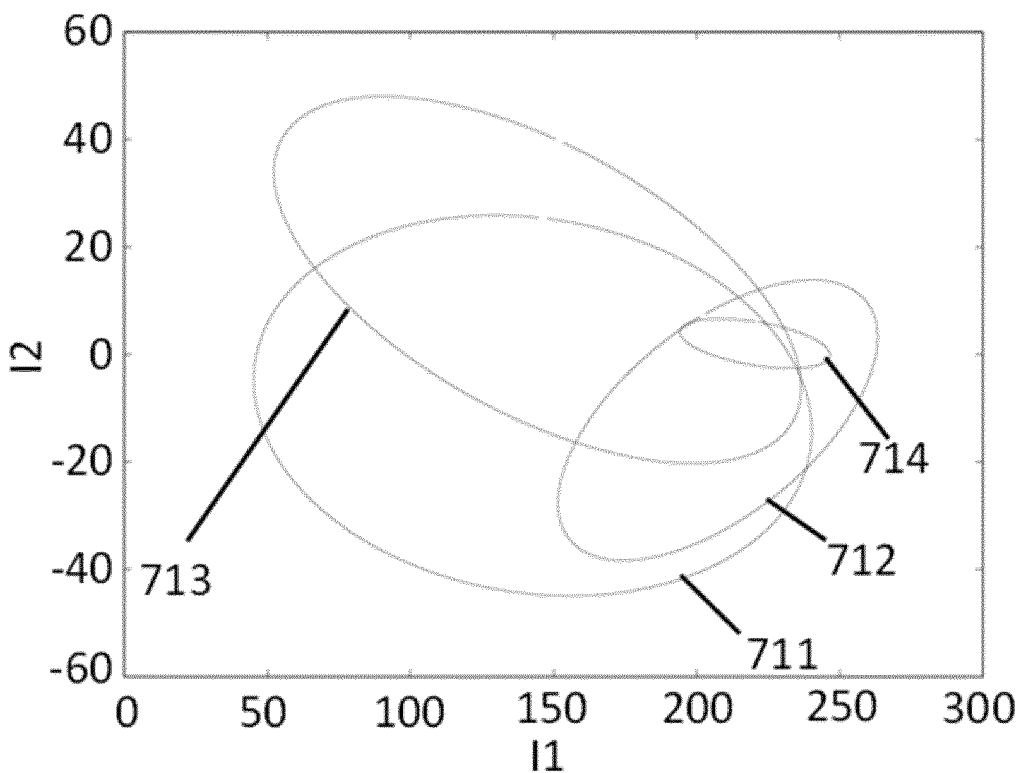

FIG. 31a illustrates a bidimensional distribution as function of $I_1$ and $I_2$. This bidimensional distribution forms a set of distribution(s). Each dot 710 represents the value of a pixel in the second color space. FIG. 31b illustrates four Gaussian curves that fit the bidimensional distribution of FIG. 31a. A first ellipse 711 corresponds to red in the RGB space. A second ellipse 712 corresponds to blue in the RGB space. A third ellipse 713 corresponds to green in the RGB space. A fourth ellipse 714 corresponds to background pixels.

FIG. 32 illustrates the result of the analysis with the four ellipses with the red (first ellipse—nuclei), the blue (second ellipse—cytoplasm), the green (third ellipse—collagen) and black for the background pixels. It corresponds to the same area as FIG. 29.

FIG. 33a is a zoom on a given area on FIG. 29 and FIG. 33b is a zoom on the same area on FIG. 32.

FIG. 34 illustrates a tiling of FIG. 32 with hexagonal macro-pixels.

FIG. 35 illustrates the macro-pixels with a color that corresponds to their amount of collagen.

FIG. 36 illustrates the macro-pixels with a color that corresponds to their amount of cytoplasm.

Figure 37:
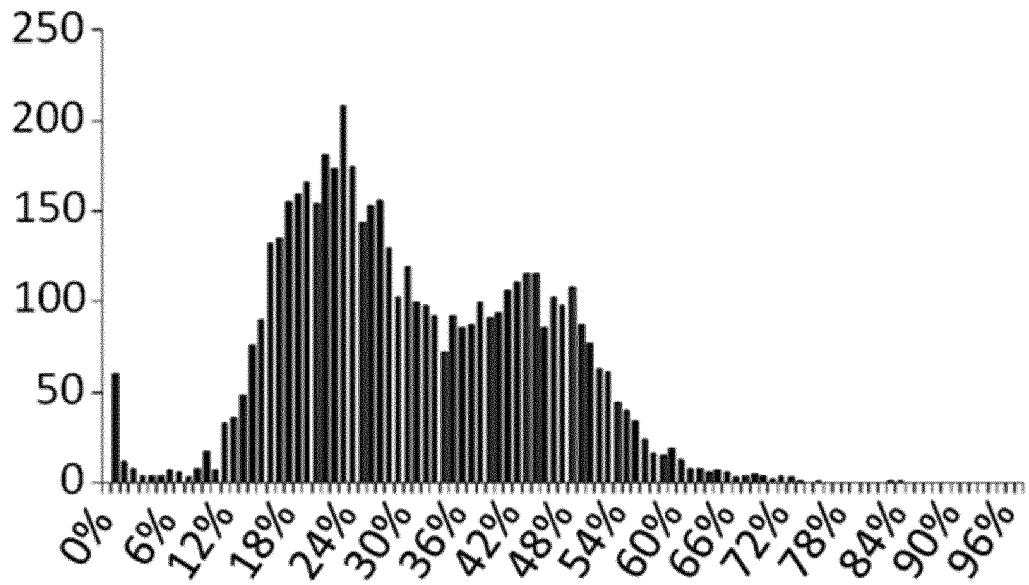
FIG. 37 illustrates a distribution of the macro-pixels as function of their amount of collagen.

FIG. 37 illustrates a distribution of the macro-pixels as function of their amount of collagen.

Figure 38:
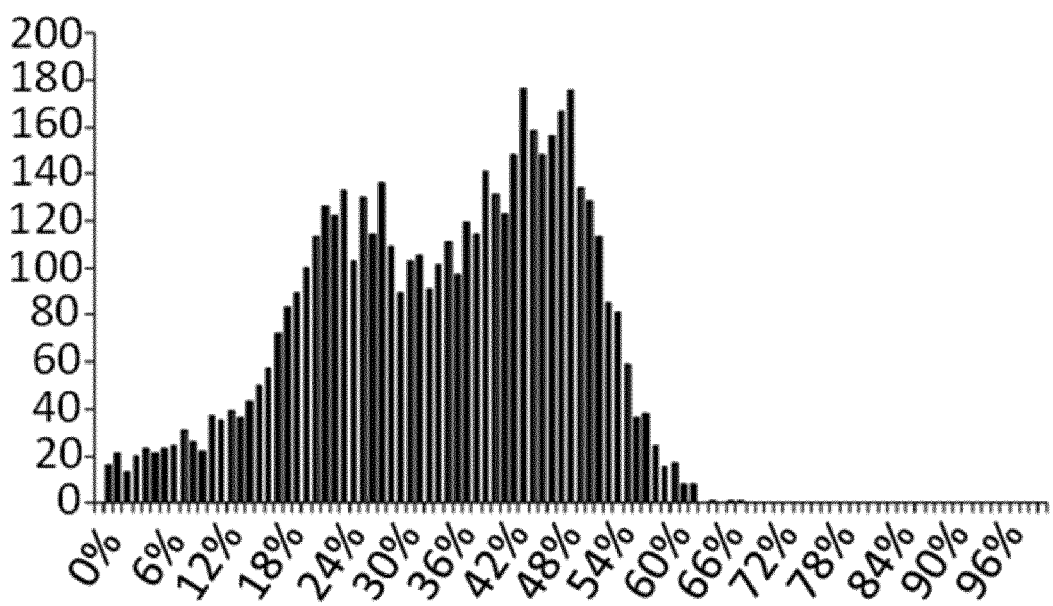
FIG. 38 illustrates a distribution of the macro-pixels as function of their amount of cytoplasm.

FIG. 38 illustrates a distribution of the macro-pixels as function of their amount of cytoplasm.

Example 4

Figure 39:
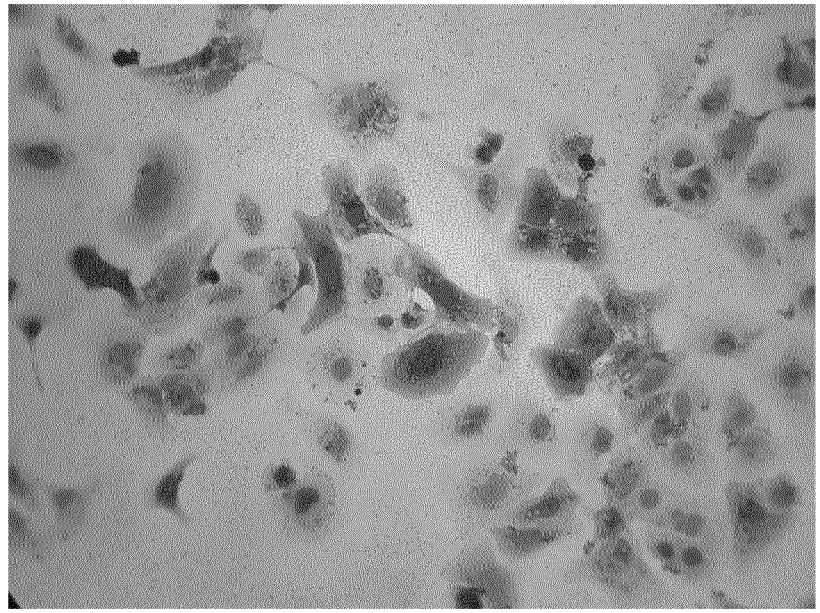
FIG. 39 illustrates a first digital image in an example of the present invention.

FIG. 39 illustrates the first digital image 103 (FIG. 1) showing whole cells immunostained using an anti-luciferase antibody, 48 hours after transfection with a luciferase plasmid.

Figure 40:
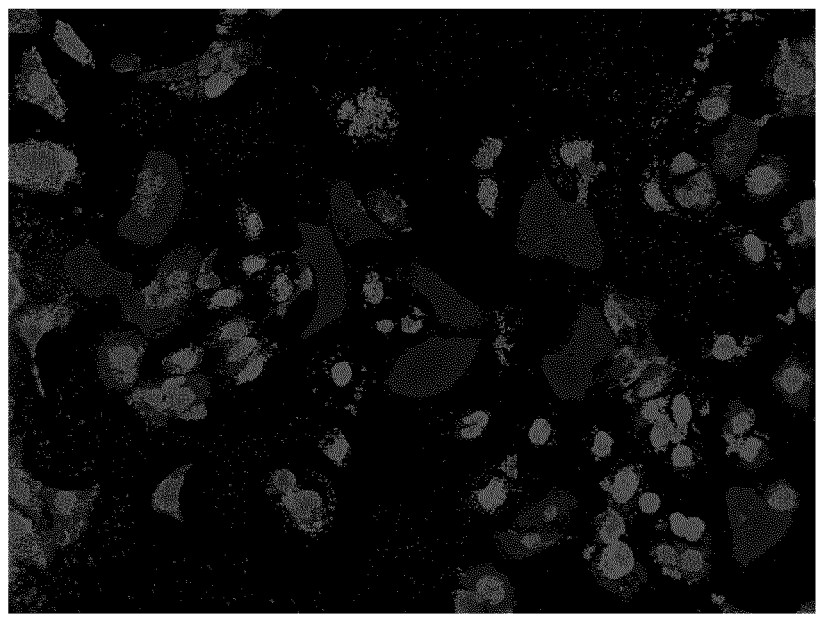
FIG. 40 illustrates a second digital image that corresponds to the part of the first digital image illustrated at FIG. 39.

FIG. 40 illustrates the second digital image 104 (FIG. 1) that corresponds to the part of the first digital image 103 illustrated at FIG. 39.

A possible embodiment of the invention is a process (100) for classifying pixels of a digital image of a biological sample (101) and comprising the steps of:
(a) receiving (202) a first digital image (103) representing a biological sample (101), a red value R, a green value G and a blue value B being associated with each pixel of the first digital image (103);
(b) changing (203) of color space with the equation $$\begin{bmatrix} I_1 \\ I_2 \\ I_3 \end{bmatrix} = \begin{bmatrix} \frac{1}{3} & \frac{1}{3} & \frac{1}{3} \\ \frac{1}{2} & 0 & -\frac{1}{2} \\ -\frac{1}{4} & \frac{1}{2} & -\frac{1}{4} \end{bmatrix} \times \begin{bmatrix} R \\ G \\ B \end{bmatrix}$$

to obtain a second digital image (104), $I_1$, $I_2$ and $I_3$ being color values associated with each pixel of the second digital image (104);
(c) determining (204) a classification condition (105) based on the values in $I_1$ and on the values in $I_2$ and/or $I_3$ of at least some pixels in the second digital image (104); and
(d) classifying (205) pixels of the second digital image (104) that fulfill the classification condition (105) in a first class (106).

In this process, it is preferred that step (c) comprises:
determining (211) a set (111) of one or several distribution(s), the set (111) comprising at least one distribution of a number of pixels in the second digital image (104) as function of $I_1$ and the set (111) comprising at least one distribution of a number of pixels in the second digital image (104) as function of $I_j$ with j=2 or 3,
fitting (212) the distribution(s) of the set (111) to determine at least one fitting parameter (112), and
determining the classification condition (105) from the at least one fitting parameter (112).

In other words, the invention relates to a computer-implemented process to automatically analyze a digital image 103 of a biological sample 101. The process involves a change 203 from a first color space (for example RGB) to a second color space (for example Ohta). Then, fits are performed taking into account several dimensions of the second color space to classify pixels. For example, the color values in intensity and in at least one of "red against blue" and "magenta against green" are used to select stained or colored pixels.

Although the present invention has been described above with respect to particular embodiments, it will readily be appreciated that other embodiments are also possible.

The invention claimed is:

1. A process for classifying pixels of a digital image of a biological sample and comprising the steps of:
(a) receiving a first digital image representing the biological sample, in order to obtain a value $X_1$ associated with each pixel of the first digital image, and obtaining at least one other value $X_i$ for each pixels from at least one of the first digital image and a further digital image, i being an integer such that 2≤i≤n and n being an integer such than n≥2;
(b) changing of space with the matrix multiplication $I = A \times X$ to obtain a second digital image, X being a matrix of n lines and 1 column including the values $X_1$ to $X_n$, I being a matrix of m lines and 1 column including values $I_1$ to $I_m$, m being an integer equal to 2 or higher, $I_1$ to $I_m$ being values associated with each pixel of the second digital image, A being a matrix of m lines and n columns;

(c) determining a classification condition based on the values in $I_1$ and on the values in $I_j$ of at least some pixels in the second digital image with j>1 and j≤m; and (d) classifying pixels of the second digital image that fulfill the classification condition in a first class;

wherein step (c) comprises:
determining a set of one or more distributions, the set comprising at least one distribution of a number of pixels in the second digital image as function of $I_1$ and the set comprising at least one distribution of a number of pixels in the second digital image as function of $I_j$ with j>1 and j≤m, fitting the one or more distributions of the set to determine at least one fitting parameter, and determining the classification condition from the at least one fitting parameter.

2. The process according to claim 1, wherein the set of one or more distributions comprises a distribution that is function of $I_1$ and function of $I_j$ with j≥1 and j≤m.

3. The process according to claim 1, wherein the set of one or more distributions comprises a first distribution that is function of $I_1$ and a second distribution that is function of $I_j$ with j>1 and j≤m.

4. The process according to claim 1, wherein the classification condition for a considered pixel relates to the value of the considered pixel in $I_1$ and in the at least one $I_j$ with j>1 and j≤m.

5. The process according to claim 1, wherein an empirical calibration parameter is used in the determination of the classification condition, said empirical calibration parameter having been determined by showing calibration biological samples, prepared in the same way as the biological sample, to biological practitioners.

6. The process according to claim 1, further comprising a determination of the matrix A from a principal component analysis from an independent component analysis, or from a factorial analysis on the matrix X.

7. The process according to claim 1, wherein n=3, m=3, $X_1$ is a red value R in the first digital image, $X_2$ is a green value G in the first digital image, and $X_3$ is a blue value B in the first digital image, and wherein $$A = \begin{bmatrix} \frac{1}{3} & \frac{1}{3} & \frac{1}{3} \\ \frac{1}{2} & 0 & -\frac{1}{2} \\ -\frac{1}{4} & \frac{1}{2} & -\frac{1}{4} \end{bmatrix}.$$

8. The process according to claim 1, wherein the first digital image shows at least part of the biological sample stained according to a first staining technique.

9. The process according to claim 8, wherein the further digital image shows at least part of the biological sample stained according to a second staining technique.

10. The process according to claim 1, wherein the first digital image is obtained from an optical image, an image in fluorescence or an image in polarization.

11. The process according to claim 1, wherein $X_2$ is obtained from the further digital image and at least one $X_i$ with i>2 is obtained from an other digital image.

12. The process according to claim 1, wherein $X_1$ is obtained from a combination of the first digital image with an other digital image and at least one $X_i$ for 2≤i≤n is obtained from a combination of the further digital image with the other digital image.

13. A data processing device comprising means for carrying out the process according to claim 1.

14. A non-transitory computer-readable medium comprising instructions which, when executed by a data processing device, cause the data processing device to carry out the process according to claim 1.

* * * * *